(12) United States Patent
Azancot et al.

(10) Patent No.: US 8,441,364 B2
(45) Date of Patent: May 14, 2013

(54) INDUCTIVE POWER OUTLET LOCATOR

(75) Inventors: Yossi Azancot, Jerusalem (IL); Amir Ben-Shalom, Modiin (IL); Oola Greenwald, Mevasseret Zion (IL); Arik Rofe, Jerusalem (IL)

(73) Assignee: Powermat Technologies, Ltd, Neve Ilan (IL)

( * ) Notice: Subject to any disclaimer, the term of this patent is extended or adjusted under 35 U.S.C. 154(b) by 836 days.

(21) Appl. No.: 12/563,635

(22) Filed: Sep. 21, 2009

(65) Prior Publication Data

US 2010/0073177 A1    Mar. 25, 2010

Related U.S. Application Data

(63) Continuation of application No. PCT/IL2008/000401, filed on Mar. 23, 2008.

(60) Provisional application No. 60/907,132, filed on Mar. 22, 2007, provisional application No. 60/935,847, filed on Sep. 4, 2007, provisional application No. 61/006,076, filed on Dec. 18, 2007, provisional application No. 61/006,106, filed on Dec. 19, 2007, provisional application No. 61/006,488, filed on Jan. 16, 2008, provisional application No. 61/006,721, filed on Jan. 29, 2008.

(51) Int. Cl.
*G08B 21/00* (2006.01)
*G01R 19/00* (2006.01)
*H04N 9/04* (2006.01)
*H04M 1/00* (2006.01)

(52) U.S. Cl.
USPC ......... 340/657; 324/66; 348/207.99; 455/566

(58) Field of Classification Search .................. 340/657, 340/572.1, 656; 702/65, 150; 320/108; 324/66; 348/207.99–376; 455/405, 566, 41.1–41.3, 455/556.1
See application file for complete search history.

(56) References Cited

U.S. PATENT DOCUMENTS 3,771,085 A    11/1973   Hojo et al.
3,938,018 A    2/1976    Dahl
(Continued)

FOREIGN PATENT DOCUMENTS

EP    0160990 A2    11/1985
EP    0160990 B1    1/1991
(Continued)

OTHER PUBLICATIONS

S.Y.R. Hui, et al., A New Generation of Universal Contactless Battery Charging Platform for Portable Consumer Electronic Equipment, IEEE Transactions on Power Electronics, vol. 20, No. 3, May 2005.

(Continued)

*Primary Examiner* — Daniel Wu
*Assistant Examiner* — Mohamed Barakat
(74) *Attorney, Agent, or Firm* — Brooks Kushman P.C.

(57) ABSTRACT

A power outlet locator for locating concealed inductive power outlet. A sensor is provided for detecting a signal emitted by an inductive power outlet. A processor uses the detected signal to compute location coordinates of the power outlet. A user interface is provided to communicate the location of the power outlet to a user.

30 Claims, 20 Drawing Sheets

Location of a power outlet indicated by a virtual target superimposed over an image of a surface displayed on a mobile phone

U.S. PATENT DOCUMENTS

| | | | |
|---|---|---|---|
| 4,160,193 A | 7/1979 | Richmond | |
| 4,431,948 A | 2/1984 | Elder et al. | |
| 4,575,659 A * | 3/1986 | Pezzolo et al. | 315/159 |
| 4,754,180 A | 6/1988 | Kiedrowski | |
| 4,977,515 A | 12/1990 | Rudden et al. | |
| 5,221,877 A | 6/1993 | Falk | |
| 5,278,771 A | 1/1994 | Nyenya | |
| 5,325,046 A * | 6/1994 | Young et al. | 323/356 |
| 5,367,242 A | 11/1994 | Hulman | |
| 5,455,466 A | 10/1995 | Parks et al. | |
| 5,486,394 A | 1/1996 | Stough | |
| 5,528,113 A | 6/1996 | Boys et al. | |
| 5,550,452 A | 8/1996 | Shirai et al. | |
| 5,600,225 A | 2/1997 | Goto | |
| 5,713,939 A | 2/1998 | Nedungadi et al. | |
| 5,734,254 A | 3/1998 | Stephens | |
| 5,762,250 A | 6/1998 | Carlton et al. | |
| 5,821,728 A | 10/1998 | Schwind | |
| 5,821,731 A | 10/1998 | Kuki et al. | |
| 5,907,285 A | 5/1999 | Toms et al. | |
| 5,929,598 A | 7/1999 | Nakama et al. | |
| 5,949,214 A | 9/1999 | Broussard et al. | |
| 6,042,005 A | 3/2000 | Basile et al. | |
| 6,211,649 B1 | 4/2001 | Matsuda | |
| 6,230,029 B1 | 5/2001 | Hahn et al. | |
| 6,396,935 B1 | 5/2002 | Makkonen | |
| 6,436,299 B1 | 8/2002 | Baarman et al. | |
| 6,441,589 B1 | 8/2002 | Frerking et al. | |
| 6,484,260 B1 | 11/2002 | Scott et al. | |
| 6,532,298 B1 | 3/2003 | Cambier et al. | |
| 6,586,909 B1 | 7/2003 | Trepka | |
| 6,624,616 B1 | 9/2003 | Frerking et al. | |
| 6,644,557 B1 | 11/2003 | Jacobs | |
| 6,673,250 B2 | 1/2004 | Kuennen et al. | |
| 6,721,540 B1 | 4/2004 | Hayakawa | |
| 6,731,071 B2 | 5/2004 | Baarman | |
| 6,766,040 B1 | 7/2004 | Catalano et al. | |
| 6,803,744 B1 * | 10/2004 | Sabo | 320/108 |
| 6,825,620 B2 | 11/2004 | Kuennen et al. | |
| 6,888,438 B2 | 5/2005 | Hui et al. | |
| 6,894,457 B2 | 5/2005 | Germagian et al. | |
| D519,275 S | 4/2006 | Shertzer | |
| 7,036,948 B1 * | 5/2006 | Wyatt | 362/95 |
| 7,043,060 B2 | 5/2006 | Quintana | |
| 7,102,344 B1 * | 9/2006 | Short | 324/66 |
| 7,117,009 B2 * | 10/2006 | Wong et al. | 455/556.1 |
| 7,126,450 B2 | 10/2006 | Baarman et al. | |
| 7,132,918 B2 | 11/2006 | Baarman et al. | |
| 7,164,255 B2 * | 1/2007 | Hui | 320/108 |
| 7,180,248 B2 | 2/2007 | Kuennen et al. | |
| 7,180,265 B2 | 2/2007 | Naskali et al. | |
| 7,224,086 B2 | 5/2007 | Germagian et al. | |
| 7,233,319 B2 | 6/2007 | Johnson et al. | |
| 7,262,700 B2 * | 8/2007 | Hsu | 340/572.1 |
| D553,852 S | 10/2007 | Brandenburg | |
| 7,352,289 B1 * | 4/2008 | Harris | 340/870.07 |
| 7,385,357 B2 | 6/2008 | Kuennen et al. | |
| 7,392,068 B2 | 6/2008 | Dayan et al. | |
| 7,405,535 B2 | 7/2008 | Frerking et al. | |
| 7,462,951 B1 | 12/2008 | Baarman | |
| D586,809 S | 2/2009 | Jones et al. | |
| 7,518,267 B2 | 4/2009 | Baarman | |
| 7,522,878 B2 | 4/2009 | Baarman | |
| 7,576,514 B2 | 8/2009 | Hui | |
| D599,735 S | 9/2009 | Amidei et al. | |
| D599,736 S | 9/2009 | Ferber et al. | |
| D599,737 S | 9/2009 | Amidei et al. | |
| D599,738 S | 9/2009 | Amidei et al. | |
| D603,603 S | 11/2009 | Laine et al. | |
| 7,612,528 B2 | 11/2009 | Baarman et al. | |
| D607,879 S | 1/2010 | Ferber et al. | |
| D611,407 S | 3/2010 | Webb | |
| D611,408 S | 3/2010 | Ferber et al. | |
| 2002/0057584 A1 | 5/2002 | Brockmann | |
| 2002/0158512 A1 | 10/2002 | Mizutani et al. | |
| 2003/0210106 A1 | 11/2003 | Cheng et al. | |
| 2004/0023633 A1 | 2/2004 | Gordon | |
| 2004/0195767 A1 | 10/2004 | Randall | |
| 2004/0203537 A1 | 10/2004 | Yoshida et al. | |
| 2004/0242264 A1 | 12/2004 | Cho | |
| 2004/0261802 A1 | 12/2004 | Griffin et al. | |
| 2005/0007067 A1 | 1/2005 | Baarman et al. | |
| 2005/0083020 A1 | 4/2005 | Baarman | |
| 2005/0130593 A1 | 6/2005 | Michalak | |
| 2005/0169506 A1 | 8/2005 | Fenrich et al. | |
| 2005/0189910 A1 * | 9/2005 | Hui | 320/108 |
| 2005/0192062 A1 | 9/2005 | Mickle et al. | |
| 2005/0233768 A1 | 10/2005 | Guo et al. | |
| 2006/0028176 A1 | 2/2006 | Tang et al. | |
| 2006/0043927 A1 | 3/2006 | Beart et al. | |
| 2006/0052144 A1 | 3/2006 | Seil et al. | |
| 2006/0061325 A1 | 3/2006 | Tang et al. | |
| 2006/0071632 A1 | 4/2006 | Ghabra et al. | |
| 2006/0091222 A1 | 5/2006 | Leung et al. | |
| 2006/0093132 A1 | 5/2006 | Desormiere et al. | |
| 2006/0202665 A1 | 9/2006 | Hsu | |
| 2007/0023559 A1 | 2/2007 | Scapillato et al. | |
| 2007/0057763 A1 | 3/2007 | Blattner et al. | |
| 2007/0076459 A1 | 4/2007 | Limpkin | |
| 2007/0136593 A1 | 6/2007 | Plavcan et al. | |
| 2007/0165371 A1 | 7/2007 | Brandenburg | |
| 2007/0182367 A1 | 8/2007 | Partovi | |
| 2007/0228833 A1 * | 10/2007 | Stevens et al. | 307/45 |
| 2007/0279002 A1 * | 12/2007 | Partovi | 320/115 |
| 2008/0001922 A1 | 1/2008 | Johnson et al. | |
| 2008/0030985 A1 | 2/2008 | Jeon et al. | |
| 2008/0049988 A1 | 2/2008 | Basile et al. | |
| 2008/0079388 A1 | 4/2008 | Sarnowski et al. | |
| 2008/0132293 A1 | 6/2008 | Gundlach et al. | |
| 2008/0157715 A1 | 7/2008 | Rosenboom et al. | |
| 2008/0223926 A1 | 9/2008 | Miller et al. | |
| 2008/0252469 A1 * | 10/2008 | Perten et al. | 340/585 |
| 2008/0258680 A1 | 10/2008 | Frerking et al. | |
| 2008/0265835 A1 | 10/2008 | Reed et al. | |
| 2009/0026959 A1 | 1/2009 | Lin et al. | |
| 2009/0040807 A1 | 2/2009 | Doumae et al. | |
| 2009/0047768 A1 | 2/2009 | Jain | |
| 2009/0047769 A1 | 2/2009 | Bhat et al. | |
| 2009/0075704 A1 | 3/2009 | Wang | |
| 2009/0079387 A1 | 3/2009 | Jin et al. | |
| 2009/0084705 A1 | 4/2009 | Justiss | |
| 2009/0097221 A1 | 4/2009 | Sayed et al. | |
| 2009/0102416 A1 | 4/2009 | Burley | |
| 2009/0134972 A1 | 5/2009 | Wu, Jr. et al. | |
| 2009/0146608 A1 | 6/2009 | Lee | |
| 2009/0153098 A1 | 6/2009 | Toya et al. | |
| 2009/0153297 A1 | 6/2009 | Gardner | |
| 2009/0174263 A1 | 7/2009 | Baarman et al. | |
| 2009/0203355 A1 | 8/2009 | Clark | |
| 2009/0212639 A1 | 8/2009 | Johnson | |
| 2009/0226050 A1 | 9/2009 | Hughes | |
| 2009/0243791 A1 | 10/2009 | Partin et al. | |
| 2009/0251102 A1 | 10/2009 | Hui | |
| 2009/0273891 A1 | 11/2009 | Peiker | |
| 2009/0278494 A1 | 11/2009 | Randall | |
| 2010/0039066 A1 | 2/2010 | Yuan et al. | |

FOREIGN PATENT DOCUMENTS

| | | | |
|---|---|---|---|
| EP | 0558316 A1 | | 1/1993 |
| EP | 1990734 A1 | | 11/2008 |
| GB | 2399466 A | | 9/2004 |
| GB | 2399466 B | | 11/2005 |
| JP | 2001155944 A | * | 6/2001 |
| JP | 2005006460 A | * | 1/2005 |
| JP | 2006060909 A | * | 3/2006 |
| WO | 9602879 A1 | | 2/1996 |
| WO | 0215320 A1 | | 2/2002 |
| WO | 0201557 A1 | | 3/2002 |
| WO | 2006015143 A2 | | 2/2006 |
| WO | 2008030985 A2 | | 3/2008 |
| WO | 2008086080 A2 | | 7/2008 |
| WO | 2008093334 A2 | | 7/2008 |
| WO | 2008114268 A2 | | 9/2008 |
| WO | 2009040807 A2 | | 4/2009 |
| WO | 2009047768 A2 | | 4/2009 |
| WO | 2009047769 A2 | | 4/2009 |

| | | |
|---|---|---|
| WO | 2009049657 A1 | 4/2009 |
| WO | 2009108958 A1 | 9/2009 |
| WO | 2010/025156 A1 | 3/2010 |
| WO | 2010/025157 A1 | 3/2010 |

OTHER PUBLICATIONS

X. Liu, et al., An Analysis of a Double-layer Electromagnetic Shield for a Universal Contactless Battery Charging Platform, IEEE 2006.

X. Liu, Equivalent Circuit Modeling of a Multilayer Planar Winding Array Structure for Use in a Universal Contactless Battery Charging Platform, 2006 IEEE.

S.C. Tang, et al., Evaluation of the Shielding Effects on Printed-Circuit-Board Transformers Using Ferrite Plates and Copper Sheets, 2002 IEEE.

Y.P. Xu, et al., Extended Theory on the Inductance Calculation of Planar Spiral Windings Including the Effect of Double-layer Electromagnetic Shield, 2007 IEEE.

Xun Liu, et al., Optimal Design of a Hybrid Winding Structure for Planar Contactless Battery Charging Platform, 2007 IEEE.

Xun Liu, et al., Simulation Study and Experimental Verification of a Universal Contactless Battery Charging Platform With Localized Charging Features, 2007 IEEE.

International Search Report and Written Opinion as filed in PCT/IL2008/001282, as mailed on Mar. 3, 2009.

International Search Report and Written Opinion as filed in PCT/IL2008001347, as mailed on Feb. 17, 2009.

International Search Report and Written Opinion as filed in PCT/IL2008/001348, as mailed on Oct. 12, 2008.

* cited by examiner

A computer being powered by the concealed power outlet

Location of a power outlet indicated by a virtual target superimposed over an image of a surface displayed on a mobile phone

INDUCTIVE POWER OUTLET LOCATOR

CROSS-REFERENCE TO RELATED APPLICATIONS

This application is a continuation of PCT application Serial No. PCT/IL2008/000401 filed Mar. 23, 2008, which claims the benefit of U.S. provisional application Ser. Nos. 60/907,132 filed Mar. 22, 2007, 60/935,847 filed Sep. 4, 2007, 61/006,076 filed Dec. 18, 2007, 61/006,106 filed Dec. 19, 2007, 61/006,488 filed Jan. 16, 2008 and 61/006,721 filed Jan. 29, 2008.

FIELD OF THE INVENTION

The present invention is related to inductive power coupling. More particularly the invention relates to devices for locating concealed inductive power outlets.

BACKGROUND

For safety, the power supplying side of a conductive couple is generally the female part, and does not have bare conductive elements protruding therefrom. A plug coupled to the device is the corresponding male part with bare pins. The size of the pins and holes are such that a child cannot insert his or her fingers thereinto. In high quality sockets, an earth connection is provided, and, only when a plug with a longer earth pin is inserted thereinto, is it possible to insert a pin (or anything else) into the holes connected to the current carrying live and neutral wires. Nevertheless, socket holes are dangerous and children do sometimes manage to insert pencils, pins and other objects into socket holes, sometimes with fatal results. Water can also cause shorting and may result in electrocution.

It can therefore be safer and more reliable to provide socket-less power outlets such as inductive couplers. Inductive power coupling allows energy to be transferred from a power supply to an electric load without connecting wires. A power supply is wired to a primary coil and an oscillating electric potential is applied across the primary coil which induces an oscillating magnetic field therearound. The oscillating magnetic field may induce an oscillating electrical current in a secondary coil, placed close to the primary coil. In this way, electrical energy may be transmitted from the primary coil to the secondary coil by electromagnetic induction without the two coils being conductively connected. When electrical energy is transferred inductively from a primary coil to a secondary coil, the pair are said to be inductively coupled. An electric load wired in series with such a secondary coil may draw energy from the power source when the secondary coil is inductively coupled to the primary coil.

Low power inductive electrical power transmission systems over extended surfaces are not new. One such example is described in U.S. Pat. No. 7,164,255 to Hui. In Hui's system a planar inductive battery charging system is designed to enable electronic devices to be recharged. The system includes a planar charging module having a charging surface on which a device to be recharged is placed. Within the charging module, and parallel to the charging surface, at least one, and preferably an array of primary windings are provided. These couple energy inductively to a secondary winding formed in the device to be recharged. Such systems are adequate for charging batteries in that they typically provide a relatively low power inductive coupling. It will be appreciated however, that extended base units such as Hui's charging surface which transmit energy continually approximately uniformly over the whole area of the unit, are not suitable for use with high energy systems.

By not requiring holes for coupling pins, socket-less outlets may be disguised more effectively than conductive sockets, and are thus less obtrusive. A primary inductive coil, for example, may be concealed behind a surface. Generally, the fact that socket-less outlets are less obtrusive is advantageous. But being harder to spot than conventional power outlets has its disadvantages. The user must somehow locate the outlet before being able to use it by bringing a secondary coil into proximity therewith. The problem of locating such sockets is particularly acute where the power outlets are behind a concealing surface such as a desk top or wall, and the positions thereof are adjustable over a large area.

Locating mobile source 'hotspots' or sockets is particularly problematic in high power systems where no extended power transmission surface is provided. Moreover, a high power primary coil produces a large oscillating magnetic field. Where a secondary coil is inductively coupled to the primary coil, the resulting flux linkage causes power to be drawn into the secondary coil. Where there is no secondary coil to focus the power, the oscillating magnetic field causes high energy electromagnetic waves to be transmitted which may be harmful to bystanders. In contrast to low power systems, such as Hui's charging surface, where excess heat may be readily dissipated, uncoupled high power primary coils and their surroundings may become dangerously hot.

In order to provide power to electrical devices in an efficient manner it is important that certain parameters of the power are regulated. By feeding back such parameters as working voltage, current, temperature and the like, the power supply to an electric device may be optimized to minimize energy losses and to prevent excessive heating of the components. Consequently, it may be useful to provide a signal transfer channel for power regulation and the like. Thus a communication channel between source and load device is often provided alongside the power input channel in conventional conductive power supply systems. Methods for providing such a communication channel include wired connections to the device that are often packaged in the same cable as the power lines and conductively coupled to the load via conventional pin-and-socket type connectors.

Leak prevention systems which are able to detect power emanating from a primary coil of an inductive power source and to cut off power to the primary coil if no secondary coil is coupled thereto have been considered. However in order to prevent power leakage from a primary coil while a secondary coil is coupled thereto, a communication channel between the secondary and primary coil would be useful. Nevertheless due to the lack of connecting wires in inductive power couplings, conductive communication channels are not practical.

There is a need for a control system for inductive power outlets, which is capable of locating a concealed power outlet, preventing power leakage from the power outlet, locating secondary coils close to the power outlet and regulating power transfer from the power outlet to a secondary coil coupled thereto. The present invention addresses this need.

SUMMARY OF THE INVENTION

A first aspect of the invention is directed to providing signal transfer system for controlling power transfer across an inductive power coupling, said inductive power coupling comprising a primary inductive coil wired to a power source and a secondary inductive coil wired to an electric load; said system comprising:

a. at least one signal generator for generating a control signal;
b. at least one transmitter for transmitting said control signal, and
c. at least one receiver for receiving said control signal.

Optionally and preferably, the control signal for carrying encoded data pertains to at least one of the group comprising:
d. presence of said electric load;
e. location of said primary inductive coil;
f. location of said secondary inductive coil;
g. required operating voltage for said electric load;
h. required operating current for said electric load;
i. required operating temperature for said electric load;
j. required operating power for said electric load;
k. measured operating voltage for said electric load;
l. measured operating current for said electric load;
m. measured operating temperature for said electric load;
n. measured operating power for said electric load;
o. power delivered to said primary inductive coil;
p. power received by said secondary inductive coil, and
q. a user identification code.

In one embodiment, the signal generator comprises a transmission circuit connected to the secondary inductive coil; the transmitter comprising the secondary inductive coil, and the receiver comprising the primary inductive coil connected to a reception circuit wherein: said transmission circuit comprises an ancillary load selectively connectable to said secondary inductive coil, and said reception circuit comprises at least one power monitor for monitoring power provided to said primary inductive coil.

In one embodiment, the transmission circuit further comprises at least one switching unit comprising: a modulator for modulating a bit-rate signal with an input signal to create a modulated signal; and a switch for intermittently connecting said ancillary load to said secondary inductive coil according to said modulated signal, and said reception circuit further comprises: at least one current monitor for monitoring a primary current drawn by said primary inductive coil, thereby producing a primary current signal, and at least one correlator for cross-correlating said primary current signal with said bit-rate signal, thereby producing an output signal.

The signal transfer system may be further characterized by at least one of the following restrictions:
said switching unit further comprises a controller configured to encode data into said input signal;
said switching unit further comprises a frequency divider;
said inductive power coupling transfers energy with a driving frequency and said bit rate frequency is an integer fraction of said driving frequency;
said inductive power coupling is a device selected from the group comprising:
a transformer, a DC-to-DC converter, an AC-to-DC converter, an AC-to-AC converter, a flyback transformer, a flyback converter, a full-bridge converter, a half-bridge converter and a forward converter; and
said primary inductive coil is galvanically isolated from said secondary inductive coil.

In another embodiment, the transmission circuit further comprises a half-wave rectifier, and the reception circuit is configured to detect second harmonic signals in the power supplied to said primary inductive coil when said secondary inductive coil is coupled thereto.

Optionally, a plurality of the primary inductive coils are each connected to a driver and the driver is configured to selectively operate each primary inductive coil in turn so as to identify which primary inductive coil is closest to the secondary inductive coil.

Optionally, each primary inductive coil is operable at a plurality of power levels and said driver is configured to selectively operate each primary inductive coil at a low power until the primary inductive coil closest to said secondary inductive coil is identified and then to operate said primary inductive coil closest to said secondary inductive coil at a high power.

A second aspect of the invention is directed to an efficiency monitor for monitoring the efficiency of said power transfer comprising the signal transfer system described hereinabove; the efficiency monitor further comprising: at least one input power monitor for measuring the input power delivered to said primary inductive coil; at least one output power monitor for measuring the output power received by said secondary inductive coil; at least one processor for determining an index of power-loss, and at least one communication channel for communicating said input power and said output power to said processor.

Typically, the efficiency monitor is further characterized by at least one of the following restrictions:
the efficiency monitor additionally comprises at least one circuit-breaker for disconnecting said primary inductive coil from said power supply;
the input power monitor is incorporated into an inductive power outlet;
the output power monitor is incorporated into an electric device;
the index of power-loss is an efficiency quotient Q, defined as the ratio of said output power to said input power;
the index of power-loss is an efficiency differential $\Delta$, defined as the difference between said output power and said input power, and
the efficiency monitor additionally comprises hazard detectors in communication with said processor.

Optionally, the efficiency monitor is incorporated into an electric device that further comprises at least one said transmitter for transmitting said output power to said receiver.

Optionally, the transmitter is selected from the group comprising: light emitting diodes, radio transmitters, optocouplers, mechanical oscillators, audio sources, ultrasonic transducers and ancillary load transmission circuits.

The signal transfer system may be incorporated into a power outlet locator for locating an inductive power outlet, said power outlet comprising at least one said primary inductive coil and at least one said transmitter; the system further comprising:
at least one sensor for detecting said control signal;
at least one processor for receiving a sensor signal from said at least one sensor and computing at least one coordinate of a location of said power outlet, and
at least one user interface for receiving a signal from said processor and communicating said location to a user.

Typically, the power outlet locator is further characterized by at least one of the following restrictions:
the at least one sensor being selected to detect an electromagnetic field generated by at least one said primary inductive coil;
the processor calculates the distance between said sensor and said power outlet by comparing the intensity of said control signal received by the sensor with a reference value;
the processor determines the direction of said power outlet by comparing the relative intensities of said control signal as detected by a plurality of said sensors;
the location of said power outlet being encoded into said control signal and decoded by said processor;

the user interface comprises a visual display for indicating the location of said power outlet, and the user interface comprises an audible signal.

In one embodiment, the power outlet locator is incorporated into an electrical device.

Optionally, the electrical device is further characterized by at least one of the following restrictions:

the electrical device additionally comprises at least one said secondary inductive coil for powering said electrical device;

the electrical device additionally comprises at least one electrochemical power cell for powering said electrical device and at least one said secondary inductive coil wired to said electrochemical cell via a rectifier for charging said electrochemical power cell, and the electrical device is selected from the group comprising: telephones, personal digital assistants (PDAs), cameras, media players, computers, keyboards and cursor controllers.

A further aspect of the invention is directed to providing a method for transmitting a control signal through an inductive energy coupling comprising a primary inductive coil connected to a power source and a secondary inductive coil connected to an electric load, said method comprising:

providing an input signal;

providing a bit-rate signal;

modulating the bit-rate signal with the input signal to create a modulated signal;

connecting an ancillary load to said secondary inductive coil intermittently according to said modulated signal;

monitoring a primary current drawn by said primary inductive coil and producing a primary current signal, and cross-correlating said primary current signal with said bit-rate signal to generate an output signal.

A further aspect of the invention is directed to providing a method for monitoring the efficiency of power transmission by an inductive power outlet comprising at least one primary inductive coil wired to a power supply for inductively coupling with a secondary inductive coil wired to an electric device, said method comprising the steps of:

measuring the input power delivered to said primary inductive coil;

measuring the output power received by said electric device;

communicating said input power to a processor;

communicating said output power to said processor, and said processor determining an index of power-loss.

In one specific method, a working range of values for said index of power-loss is predetermined, and the method comprises the further step of: disconnecting said primary inductive coil from said power supply if said index of power-loss falls outside said working range of values.

BRIEF DESCRIPTION OF THE FIGURES

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DESCRIPTION OF THE PREFERRED EMBODIMENTS

Figure 1:
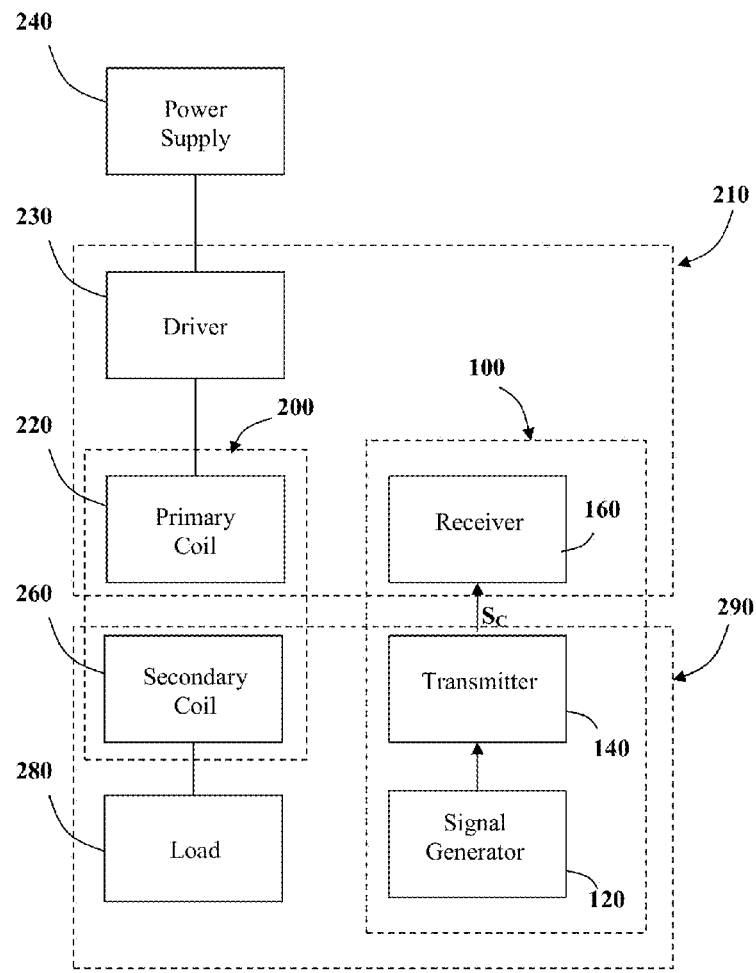
FIG. 1 is a block diagram showing the main elements of an inductive power coupling incorporating a signal transfer system according to a first embodiment of the invention.

Reference is now made to FIG. 1 showing a block diagram of the main elements of an inductive power coupling 200 incorporating a signal transfer system 100 according to a first embodiment of the invention.

The inductive power coupling 200 consists of a primary inductive coil 220 and a secondary inductive coil 260. The primary coil 220 is wired to a power supply 240 typically via a driver 230 which provides the electronics necessary to drive the primary coil 220. Driving electronics may include a switching unit providing a high frequency oscillating voltage supply, for example. The secondary coil 260 is wired to an electric load 280.

When the secondary coil 260 is brought into proximity with the primary coil 220, the pair of coils forms an inductive couple and power is transferred from the primary coil 220 to the secondary coil 260. In this way a power outlet 210 may provide power to an electric device 290.

The signal transfer system 100 comprises: a signal generator 120, for generating a control signal $S_C$; a transmitter 140 for transmitting said control signal $S_C$; and a receiver 160 for receiving said control signal $S_C$.

Although in the signal transfer system 100 described herein, the transmitter 140 is incorporated into the power outlet 210 and the receiver 160 is incorporated into the electrical device 290, it will be appreciated that a transmitter 140 may alternatively or additionally be incorporated into the electrical device 290 and a receiver 160 may alternatively or additionally be incorporated into the power outlet 210.

The control signal $S_C$ communicates encoded data pertaining to the power transmission. This data may be pertinent to regulating efficient power transmission. Examples of such data includes parameters such as: required operating voltage, current, temperature or power for the electric load 280, the measured voltage, current, temperature or power supplied to the electric load 280 during operation, the measured voltage, current, temperature or power received by the electric load 280 during operation and the like.

In other embodiments, the control signal $S_C$ may communicate data relating to the coordinates of the primary inductive coil 220 for the purposes of indicating the location of the power outlet 210. Alternatively, the control signal $S_C$ may communicate data relating to the identity or presence of the electric load 280 such as the location of the secondary coil 260, or an identification code or the electric device 290 or its user.

Various transmitters 140 and receivers 160 may be used with the signal transfer system. Where the primary and secondary coils 220, 260 are galvanically isolated for example, optocouplers may have a light emitting diode serving as a transmitter 140 which sends encoded optical signals over short distances to a photo-transistor which serves as a receiver 160. Optocouplers typically need to be aligned such that there is a line-of-sight between transmitter and receiver. In systems where alignment between the transmitter 140 and receiver 160 may be problematic, optocoupling may be inappropriate and alternative systems may be preferred such as ultrasonic signals transmitted by piezoelectric elements or radio signals such as Bluetooth, WiFi and the like. Alternatively the primary and secondary coils 220, 260 may themselves serve as the transmitter 140 and receiver 160.

Coil-to-Coil Signal Transfer

One aspect of the present embodiments relate to a signal transfer system for transferring a transmission signal regarding an electric load connectable via an inductive energy coupling to a power source. The inductive energy coupling comprises a primary coil connectable to the power source in inductive alignment with a secondary coil connectable to the electric load, the system comprises at least one ancillary load; at least one switching unit comprising a modulator for modulating a bit-rate signal with an input signal to create a modulated signal and a switch for intermittently connecting the ancillary load to the secondary coil according to the modulated signal; at least one current monitor for monitoring primary current drawn by the primary coil and producing a primary current signal, and at least one correlator for cross-correlating the primary current signal with the bit-rate signal for producing an output signal.

The switching unit preferably also comprises a controller configured to encode data into the input signal. Typically, the switching unit further comprises a frequency divider and the inductive energy coupling transfers energy with a driving frequency and the bit rate frequency is an integer fraction of the driving frequency.

The inductive energy coupling is typically a device wherein the primary coil is galvanically isolated from said secondary coil. The device may include a transformer, a DC-to-DC converter, an AC-to-DC converter, an AC-to-AC converter, a flyback transformer, a flyback converter, a full-bridge converter, a half-bridge converter, a buck converter, a boost converter, a buck-boost converter, a SEPIC converter or a zeta converter, for example.

Optionally, the input signal carries encoded data pertaining to, for example, the presence of the electric load, required operating voltage for the electric load, required operating current for the electric load, required operating temperature for the electric load, measured operating voltage for the electric load, measured operating current for the electric load, measured operating temperature for the electric load, and/or a user identification code.

In one embodiment, a contactless inductive coupling is provided, comprising the signal transfer system wherein the primary coil is embedded in a power jack and the secondary coil is embedded in a power plug galvanically isolated from the power jack.

An aspect of the technology described herein, teaches a method for transferring a signal through an inductive energy coupling, wherein the inductive energy coupling comprises a primary coil connected to a power source and a secondary coil connected to an electric load, the method comprising the following steps: providing an input signal, providing a bit-rate signal, modulating the bit-rate signal with the input signal to create a modulated signal, connecting an ancillary load to the secondary coil intermittently according to the modulated signal, monitoring a primary current drawn by the primary coil and producing a primary current signal; and cross-correlating the primary current signal with the bit-rate signal to generate an output signal.

According to another aspect, a method for regulating power transfer across a contactless inductive coupling is taught wherein the output signal provides details of power requirements of the load. Typically the input signal is provided by encoding data regarding at least one power requirement of the electric load into the input signal. Optionally and typically, the power requirement depends on parameters such as operating voltage, operating current and/or operating temperature. Alternatively the input signal is provided by monitoring at least one operating parameter of the electric load and encoding monitored parameter data into the input signal. Optionally the parameter is selected from the group comprising operating voltage, operating current and operating temperature. Typically the method for transferring a signal through an inductive energy coupling includes a preliminary step of detecting the presence of an electric load.

Figure 2A:
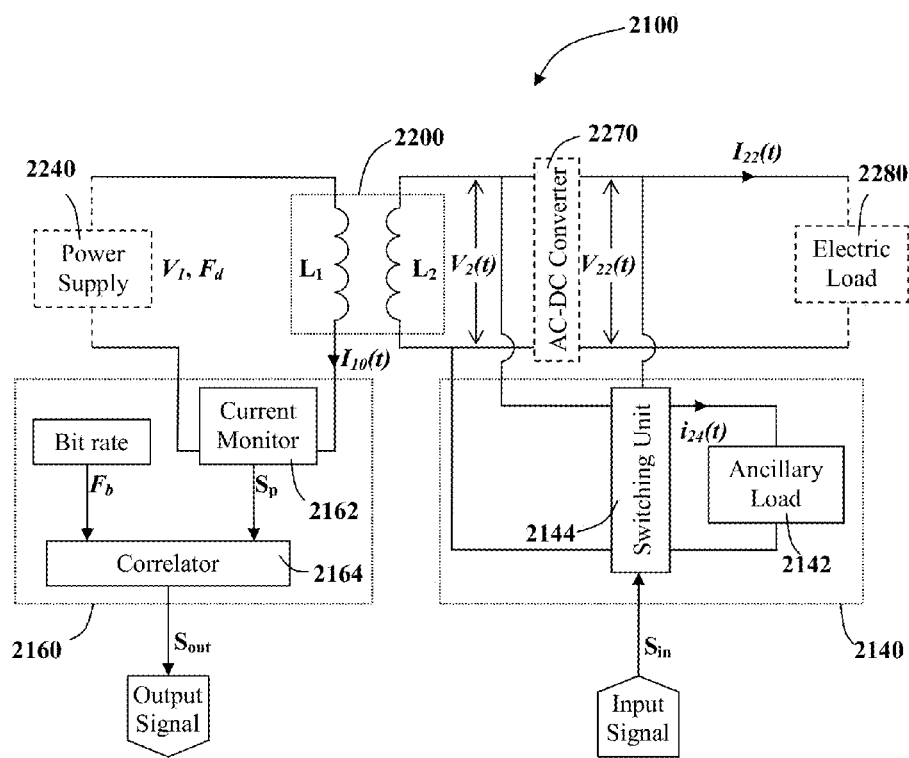
FIG. 2a-d show another embodiment of the signal transfer system in which a control signal is transmitted through an inductive energy coupling.

Reference is now made to FIGS. 2a-d wherein a signal transfer system 2100 according to a second general embodiment of the invention is shown. With particular reference to FIG. 2a, the signal transfer system 2100 is configured to transmit a transmission signal through an inductive energy coupling 2200. The inductive energy coupling 2200 consists of a primary coil $L_1$ which may be connected to a power source 2240 and a secondary coil $L_2$, galvanically isolated therefrom, across which an electric load 2280 may be connected either directly or via an AC-DC converter 2270.

A transmission circuit 2140 may be connected in parallel with the electric load 2280. The transmission circuit 2140 comprises an ancillary load 2142 connected to the secondary coil $L_2$ via a switching unit 2144. Typically the ancillary load 2142 is much smaller than the electric load 2280.

A corresponding reception circuit 2160 is connected to the primary coil $L_1$ of the inductive energy coupling 2200 and comprises a current monitor 2162, such as an ammeter in series with the primary coil $L_1$, and a correlator 2164.

The switching unit 2144 is configured to receive an input signal $S_{in}$ and a bit-rate signal $F_b$. A modulator (not shown) modulates the bit-rate signal $F_b$ with the input signal $S_{in}$ to produce a modulated signal $S_M$. The ancillary load 2142 is intermittently connected to the secondary coil $L_2$ at a rate determined by the modulated signal $S_M$.

The power source 2240, such as an alternating-current voltage source, intermittent direct current voltage source or the like, is configured and operable to produce a primary voltage $V_1$ which oscillates at a driving frequency $F_d$. The oscillating primary voltage $V_1$ in coil $L_1$ induces a secondary voltage $V_2(t)$ in the secondary coil $L_2$. The secondary voltage $V_2(t)$ is optionally passed through an AC-DC converter 22 producing a direct-current voltage $V_{22}(t)$.

The electric load 2280 which is coupled to the secondary coil $L_2$—either directly or via the AC-DC converter 2270—draws a load current $I_{22}$. The power $P_{22}$ provided to the load 2280 is given by the scalar product of the voltage $V_{22}$ and the load current $I_{22}$. When the ancillary load 2144 is connected, an additional ancillary current $i_{24}$ is also drawn. Thus, with the ancillary load 2144 connected, the total power $P_2$ drawn by the secondary coil $L_2$ is given by:

$$P_2(t) = \vec{V}_{22}(t) \cdot [\vec{I}_{22} + \vec{i}_{24}(t)]$$

where the ancillary current signal $i_{24}(t)$ varies with the modulated signal $S_M$.

The input power $P_1(t)$ provided to the primary coil $L_1$ is given by:

$$P_1(t) = \vec{V}_1(t) \cdot \vec{I}_{10}(t)$$

where the primary voltage $V_1(t)$ oscillates at the driving frequency $F_d$ which is determined by the power supply 2240.

Input power $P_1(t)$ provided by the primary coil $L_1$ is generally proportional to the total power $P_{22}(t)$ drawn by the secondary coil $L_2$, and the primary voltage $V_1(t)$ is determined by the power supply. Perturbations in the primary current $I_{10}(t)$ supplied to the primary coil $L_1$ are thus in proportion with $i_{24}(t)$.

The current monitor 2162 monitors the primary current $I_{10}(t)$ over time, producing a primary current signal $S_p$ which typically has similar characteristics to the modulated signal $S_M$. The correlator 2164 is configured to cross-correlate the primary current signal $S_p$ with the bit rate $F_b$. The output signal $S_{out}$ of the correlator 2164 therefore has the same characteristics as the input signal $S_{in}$.

In this manner, information carried by the input signal $S_{in}$ is transmitted from the transmission circuit 2140 and is retrievable by the receiver circuit 2160 from the output signal $S_{out}$. It is noted that the signal transfer system 2100 described herein, transmits a transmission signal across the same inductive power coupling 2200 as used for power transmission. This is in contradistinction to prior art transmission systems, which use additional elements to provide signal transmission channels separate from the power transmission channels. In consequence of this innovative approach, additional transmission elements such as optocouplers, piezoelectric elements, supplementary coil pairs and the like are not generally required.

Figure 2B:
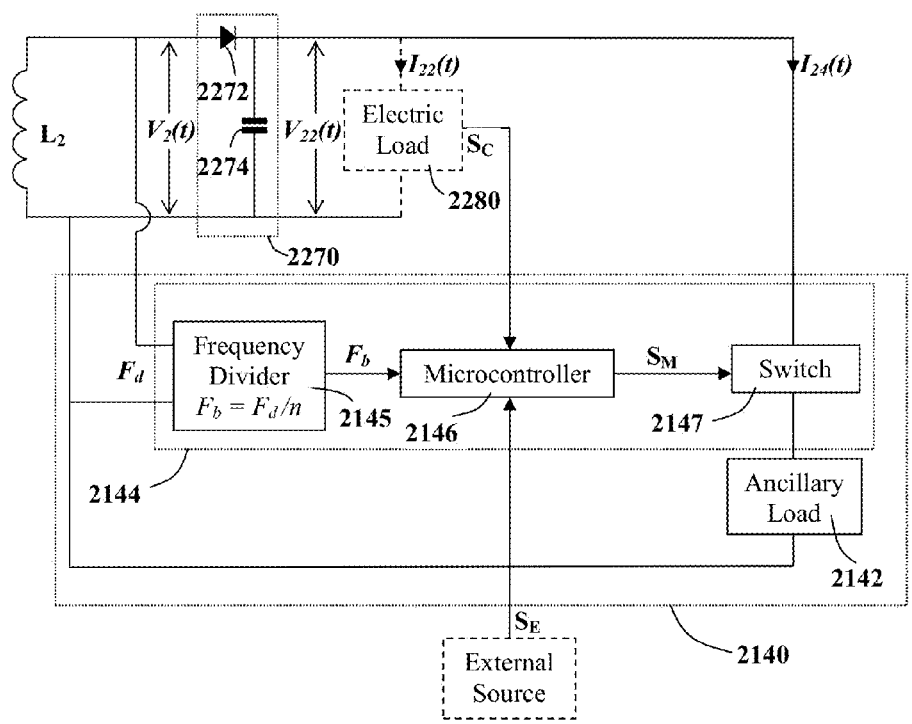

With reference now to FIG. 2b, an exemplary transmission circuit 2140 of the signal transfer system 2100 of FIG. 2a is shown. An AC-to-DC converter 2270 comprising a diode 2272 and a capacitor 2274, which is connected in parallel to the secondary coil $L_2$, converts an AC secondary voltage $V_2$ from the secondary coil $L_2$ into a DC load voltage $V_{22}$ which is connected across an electric load 2280.

The connection between the ancillary load 2142 and the load voltage $V_2$ is controlled by a switching unit 2144 which includes a frequency divider 2145, microcontroller 2146 and a switch 2147. The frequency divider 2145 provides the bit-rate signal $F_b$ which is passed to the microcontroller 2146. The microcontroller 2146 is configured to modulate the bit-rate signal $F_b$ according to input signals including control signals $S_C$ from the electric load 2280 and external signals $S_E$, as described hereinbelow.

Control signals $S_C$ may be used to regulate the power supply. Control signals $S_C$ typically provide data relating to load parameters. Typically these include the required operating voltage, current and temperature and the actual measured operating voltage, current and temperature as monitored during operation of the load.

External Signals $S_E$ may be used to provide the transmission circuit 2140 with external data to be digitally encoded into the input signal $S_{in}$ by the microcontroller 2146 and transmitted to the receiver circuit 2160. External information, may, for example, provide useful supplementary data such as a user identification code, a pass key, battery level of the load device and the like.

It will be appreciated that the ability to transmit supplementary information such as external signals $S_E$ through the inductive energy coupling 2200 presents a further advantage over prior art systems which are only suitable for transmitting control signals.

Figure 2C:
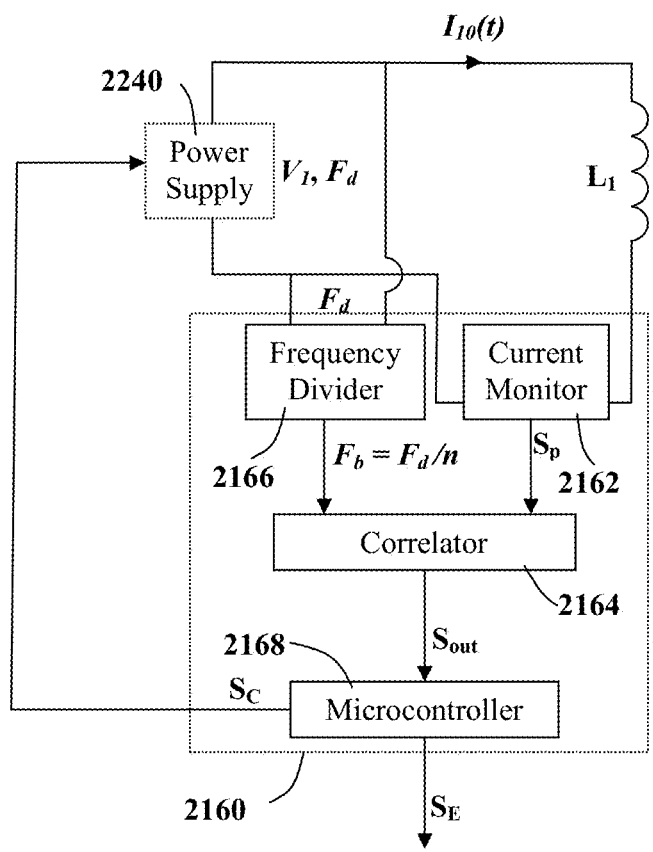

FIG. 2c shows a schematic representation of an exemplary receiver circuit 2160 in accordance with the signal transfer system of FIG. 2a, consisting of a current monitor 2162, a frequency divider 2166, a correlator 2164 and a microcontroller 2168. The frequency divider 2166 provides the bit-rate signal $F_b$ which is typically an integer fraction of the driving frequency $F_d$. The current monitor 2162 provides a primary current signal $S_P$ which is passed to the correlator 2164 for cross-correlation with the bit-rate signal $F_b$. The resulting output signal $S_{out}$ is passed to a microcontroller 2168 which may use the output signal $S_{out}$ to pass a control signal $S_C$ to control the power source 2240 so as to regulate the power provided to the electric load 2280. The microcontroller 2168 may also be used to extract external signals $S_E$ from the output signal.

Figure 2D:
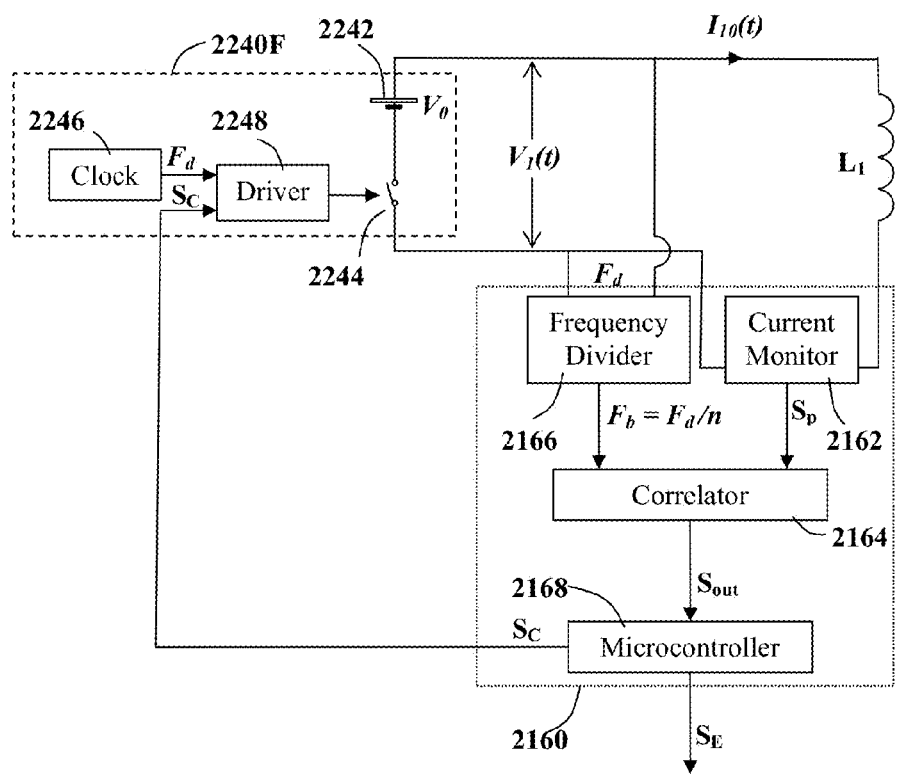

An exemplary use of the receiver circuit 2160 of FIG. 2c is highlighted in FIG. 2d which shows the receiver circuit 2160 configured to control a flyback power source 2240F. In a flyback converter, a direct current voltage source 2242 is intermittently connected to a primary coil $L_1$ by a switch 2244. This produces a varying voltage signal $V_1(t)$ in the primary coil $L_1$ which induces a secondary voltage $V_2$ in a secondary coil $L_2$ (FIG. 2a). The secondary coil $L_2$ is generally connected to a smoothing circuit such the AC-DC converter 2270 shown in FIG. 2b to produce a DC output.

The switch 2244 is controlled by a driver 2248 which receives a pulsing signal $F_d$ from a clock 2246. The pulsing signal $F_d$ determines the frequency with which the direct current voltage source 2242 is connected to the primary coil $L_1$. The power delivered to the primary coil $L_1$ may be regulated by varying the duty cycle of the switch 2244. The duty cycle is the proportion of the time between pulses during which the switch 2244 is closed.

FIG. 2d shows the innovative use of the signal transfer system 2100 which receives a feedback signal transferred between the primary and secondary power transmission coils and received by the receiver circuit 2160. This is an improvement on prior art flyback converters, wherein additional elements such as optocouplers or the like have been used to transmit feedback signals.

The microcontroller 2168 generates a control signal $S_C$ which is relayed to the driver 2248. The control signal $S_C$ determines the duty cycle of the switch 2248 and so may be used to regulate power transmission.

Although only a flyback converter is represented in FIG. 2d it is noted that a control signal $S_C$ thus transmitted may be used to regulate power transfer in a variety of transmission assemblies such as a transformer, a DC-to-DC converter, an AC-to-DC converter, an AC-to-AC converter, a flyback transformer, a full-bridge converter, a half-bridge converter or a forward converter for example.

Figure 3:
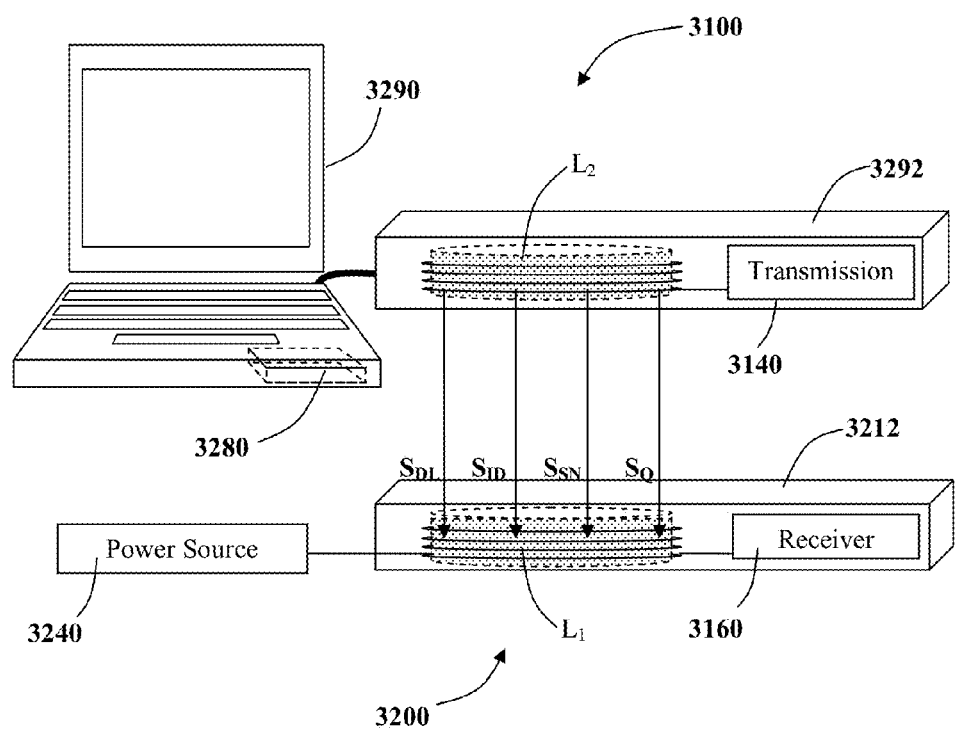
FIG. 3 is a schematic diagram showing a signal transfer system integrated into a contactless inductive power coupling system for powering a computer.

As an example of the signal transfer system 100 (FIG. 1), with reference to FIG. 3, according to a third embodiment of the invention, a signal transfer system 3100 may be integrated into a contactless inductive power coupling system 3200 where power is inductively transmitted from a jack unit 3212 to a plug unit 3292 galvanically isolated therefrom. A transmission circuit 3140 embedded in the plug unit 3292 may be used to transmit control signals $S_C$ to a receiver circuit 3160 in the jack 3212. Thus once the primary $L_1$ and secondary $L_2$ coils are aligned, control signals may be passed between the plug 3292 and jack 3212 units with no need to align additional components such as optocouplers, and the like.

Where a contactless plug 3292 is used, for example to power a portable computer 3290 having on-board power cells 3280, the signal transfer system 3100 may be used to detect the presence of the load 3290 producing a detection signal $S_{DL}$ and then to provide the jack 3212 with signals relating to the identity of the user $S_{ID}$ and the serial number $S_{SN}$ or other identifier of the laptop computer 3290. Signals regarding the operating voltage and current required by the PC may be provided as a regulatory signal $S_Q$ which may also provide supplementary information such as information related to the power level of the cells 3280, for example. Using this signal $S_Q$, the signal transfer system 3100 may be used to select between powering the computer 3290 directly, recharging the power cells 3280 thereof, or both powering and recharging, depending on defaults and predetermined criteria. It is further noted that when used for recharging cells 3280, the ability to monitor the temperature of the cells 3280 during recharging may be used to prevent overheating.

Figure 4:
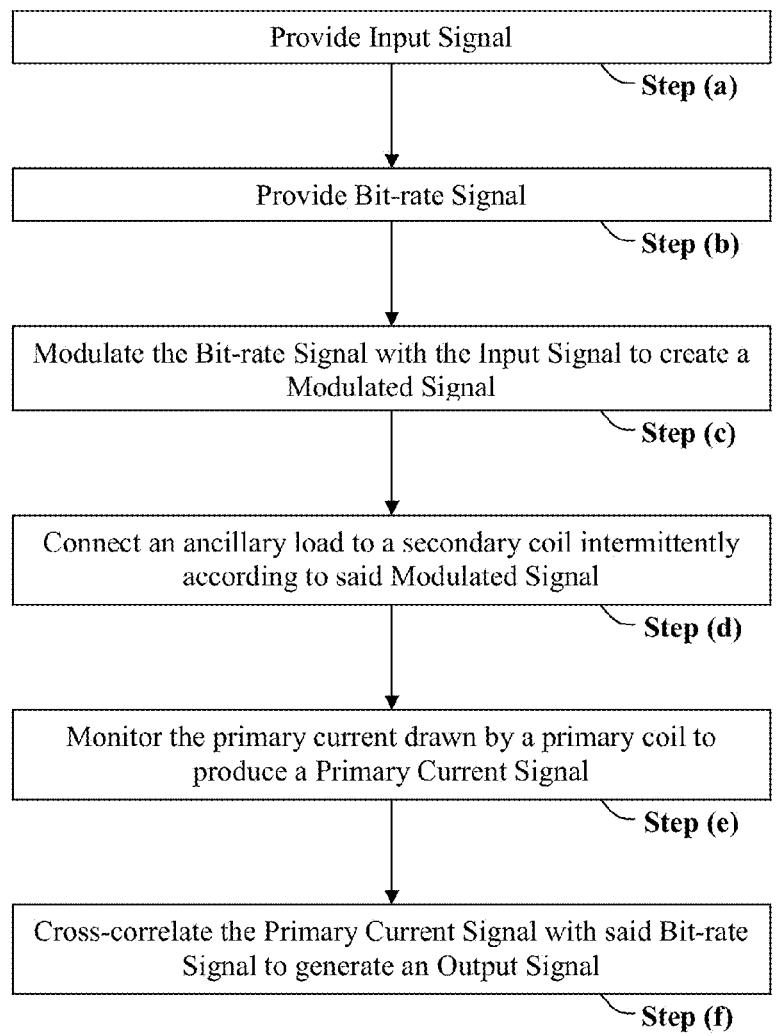
FIG. 4 is a flowchart showing a method for transferring a transmission signal through an inductive energy coupling in accordance with the invention.

Referring to FIG. 4, a flowchart showing a method for transferring a transmission signal through an inductive energy coupling in accordance with another embodiment of the invention is presented. With further reference to FIG. 2a, an Input Signal $S_{in}$—Step (a) and a Bit-rate Signal $F_b$—Step (b) are provided to the transmission circuit 2140. The Bit-rate Signal $F_b$ is then modulated by the Input Signal S, producing a Modulated Signal $S_M$—Step (c). An ancillary load 2142 is then connected to the second coil $L_2$ intermittently according to the Modulated Signal $S_M$—Step (e). The receiver circuit 2160 monitors the primary current drawn by the primary coil $L_1$ to produce a Primary Current Signal $S_P$—Step (e). This Primary Current Signal $S_P$ is then cross-correlated with the Bit-rate Signal $F_b$ to generate an Output Signal $S_{out}$—Step (f).

The basic signal transfer system and method described hereinabove are capable of variation. For example, it will be appreciated that through the use of such a system, information regarding a load 2280 may be transmitted to the power outlet 2210 across the inductor coils $L_1$ and $L_2$ of the inductive coupling 2200, as a signal superimposed on the power transmitted, without requiring additional data transmitting components.

Power Coupling Efficiency

Embodiments of the invention are directed to providing methods for monitoring the efficiency of power transmission by an inductive power outlet comprising at least one primary coil wired to a power supply, for inductively coupling with a secondary coil wired to an electric device. The method comprises the steps of: measuring the input power delivered to the primary coil, measuring the output power received by the electric device, communicating the input power to a processor, communicating the output power to the processor and the processor determining an index of power-loss.

In one specific application, the index of power-loss is an efficiency quotient Q, being the ratio of the output power to the input power, and the method comprises the further step of: disconnecting the primary coil from the power supply if the efficiency quotient Q is below a threshold value. Typically the threshold efficiency quotient is in the range of from 75% to 95%.

In another application, the index of power-loss is an efficiency differential Δ, being the difference between the output power to the input power, and the method comprises the further step of: disconnecting the primary coil from the power supply if the efficiency differential Δ is above a threshold value.

A further aspect of the technology described herein relates to an efficiency monitor for monitoring the efficiency of power transmission by an inductive power outlet of the type including at least one primary coil wired to a power supply, for inductively coupling with a secondary coil wired to an electric device. The efficiency monitor includes: at least one input power monitor for measuring the input power delivered to the primary coil; at least one output power monitor for measuring the output power received by the secondary coil; at least one processor for determining an index of power-loss; and at least one communication channel for communicating the input power and the output power to the processor.

Typically the efficiency monitor also includes at least one circuit-breaker for disconnecting the primary coil from the power supply. Preferably the input power monitor is incorporated within the power outlet and the output power monitor is incorporated within the electric device.

Optionally, the electric device comprises at least one transmitter for transmitting the output power to a receiver incorporated in the power outlet. The transmitter may include one or more light emitting diodes, radio transmitters, optocouplers, or ancillary load transmitter circuits, for example.

According to preferred embodiments, the efficiency monitor includes one or more hazard detectors in communication with the processor. Such hazard detectors may include magnetic sensors, heat sensors, electromagnetic radiation sensors and Hall probes, for example.

Figure 5:
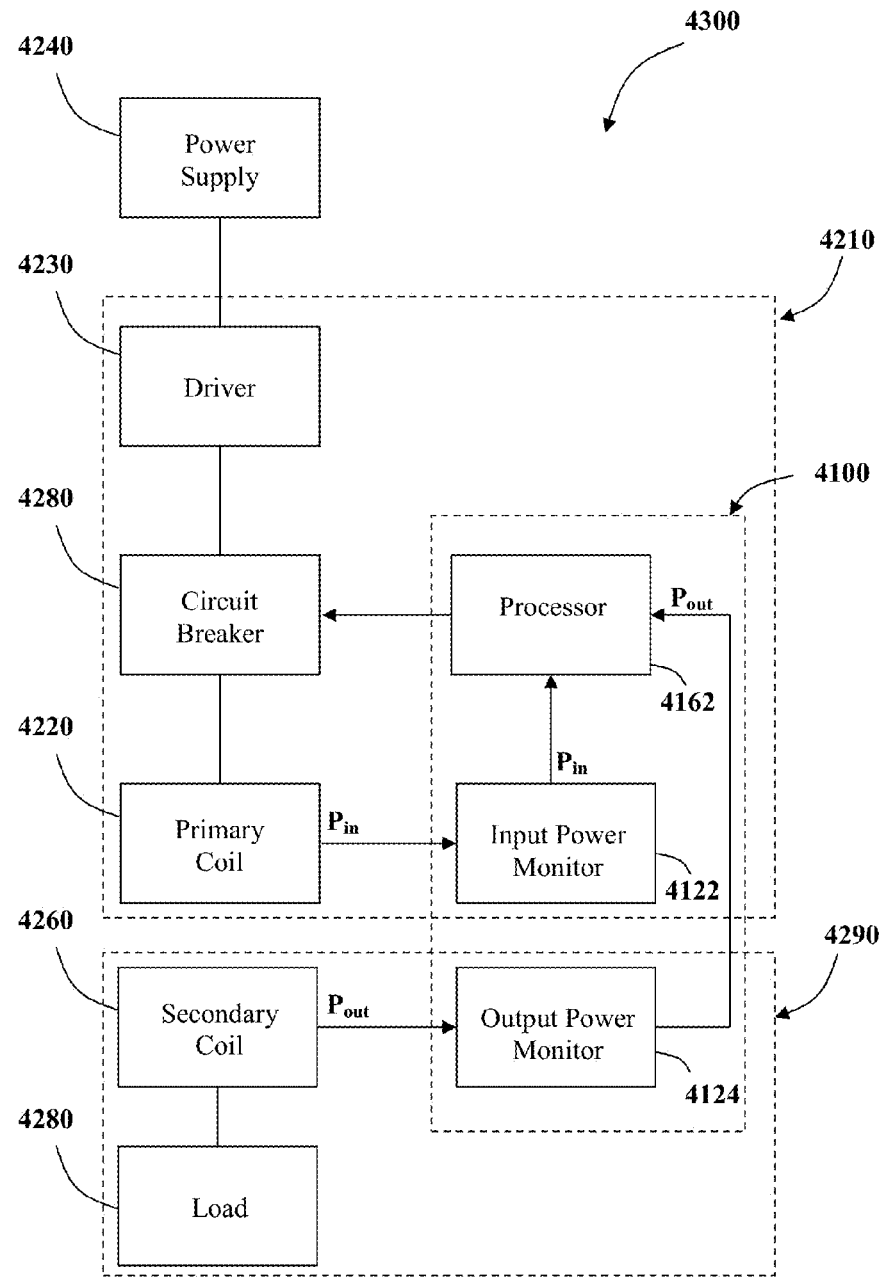
FIG. 5 is a block diagram representing another embodiment of the signal transfer system incorporated into an efficiency monitor for monitoring the efficiency of power transmission by an inductive power outlet.

Reference is now made to FIG. 5 showing a block diagram of a signal transfer system 4100. The signal transfer system 4100 is incorporated into an efficiency monitor 4300 for monitoring the efficiency of power transmission by an inductive power outlet 4210.

The inductive power outlet 4210 consists of a primary coil 4220 wired to a power supply 4240 via a driver 4230 which provides the electronics necessary to drive the primary coil 4220. Driving electronics may include a switching unit providing a high frequency oscillating voltage supply, for example.

If a secondary coil 4260 is brought into proximity with the primary coil 4220, the pair of coils forms an inductive couple, and power is transferred from the primary coil 4220 to the secondary coil 4260. In this way the power outlet 4210 may provide power to an electric device 4262 comprising an electric load 4280 wired in series with the secondary coil 4260.

The efficiency monitor 4300 consists of an input power monitor 4122 incorporated within the power outlet 4210 and an output power monitor 4124 incorporated within the electric device 4290, both in communication with a processor 4162.

The input power monitor 4122 is configured to measure the input power $P_{in}$ provided by the primary coil 4220 and communicates this value to the processor 4162. The output power monitor 4124 is configured to measure the output power $P_{out}$ received by the secondary coil 4260 and communicates this value to the processor 4162.

The processor 4162 is configured to receive the values of the input power $P_{in}$ and the output power $P_{out}$ and to calculate an index of power-loss. The index of power loss indicates how much power is leaking from the inductive couple. The index of power-loss may be the efficiency quotient Q which is the ratio between them, $P_{out}/P_{in}$, which is an indication of the efficiency of the inductive coupling. Alternatively the index of power loss may be the efficiency differential Δ which is the difference between $P_{out}$ and $P_{in}$.

The processor 4162 may additionally or alternatively be configured to trigger a circuit-breaker 4280 thereby cutting off the primary coil 4220 from the power supply 4240 when the efficiency quotient Q falls below a predetermined threshold or the efficiency differential Δ rises above a predetermined threshold. Typically, this predetermined threshold for the efficiency quotient Q is in the range of from about 75% to 95%, and more preferably about 85%.

Figure 6A:
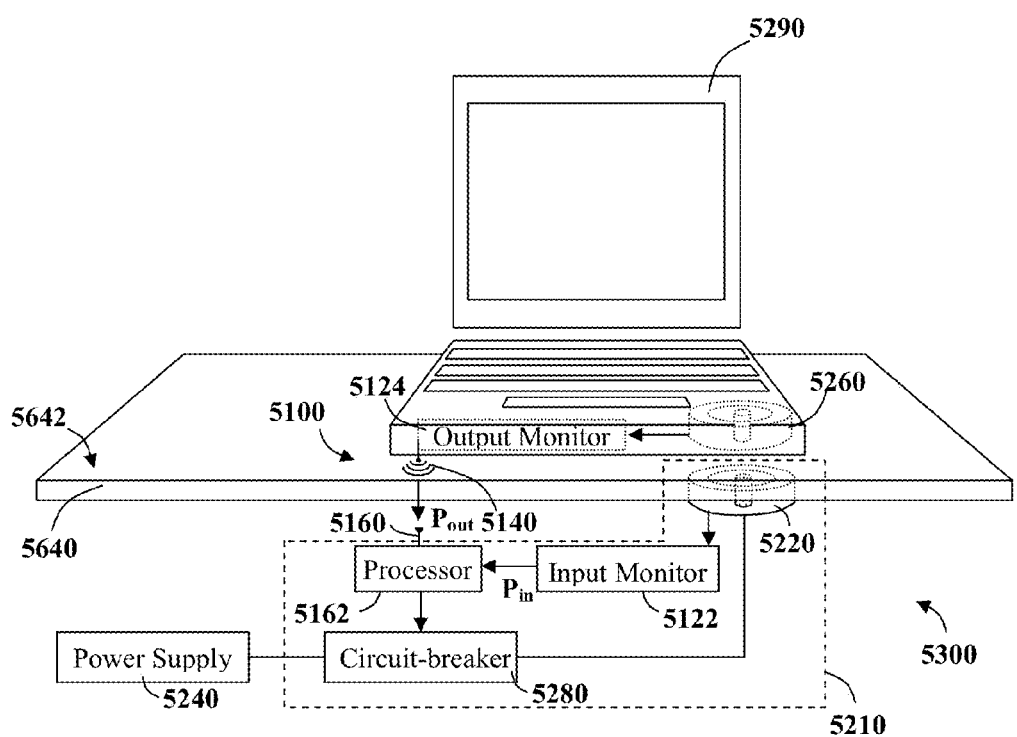
FIG. 6a is a schematic diagram of an inductive power outlet with an electrical load inductively coupled thereto, monitored by an efficiency monitor.

With reference to FIG. 6a, an efficiency monitor 5300 for an inductive power outlet 5210 is shown. Inductive power outlet 5210 consists of a primary coil 5220 wired to a power source 5240 via an efficiency monitor 5300 all concealed behind a facing layer 5642 of a horizontal platform 5640 such as a desk-top, a kitchen work-top, a conference table or a work bench. The facing layer may be a sheet of self-adhesive plastic film, plastic, vinyl, Formica or wood veneer, for example.

In other embodiments a primary coil 5220 may be concealed beneath or within flooring such as rugs, fitted carpet, parquet, linoleum, floor tiles, tiling, paving and the like. Alternatively the primary coil 5220 may be concealed behind or within a vertical surface such as a wall of a building or a cabinet, for example behind wallpaper or stretched canvas or the like.

The primary coil 5220 may be used to power an electrical device 5290 such as a computer wired to a secondary coil 5260. The electrical device 5290 is placed upon the surface 5642 of a platform 5640 such that the secondary coil 5260 is aligned with the primary coil 5220 therebeneath.

The efficiency of the power outlet 5210 is monitored by an efficiency monitor 5300. An input power monitor 5122 is incorporated within the power outlet 5210 behind the platform 5640 and is in direct conductive communication with a processor 5162. An output power monitor 5124 is incorporated within the electrical device 5290 and is not physically connected to the power outlet 5210. The output power monitor 5124 communicates with the processor 5162 via a signal transfer system 5100 comprising a transmitter 5140 incorporated within the electrical device 5290 which is configured to transmit a signal to a receiver 5160 incorporated within the power outlet 5210.

The transmitter 5140 may be a standard transmitter such as those widely used in computing and telecommunications, such as an Infra-red, Wi-fi or Bluetooth transmitter or the like. Indeed, any light emitting diodes, radio transmitters, optocouplers or other such transmitters of radiation for which the platform 5640 is translucent may be used. Alternatively a fiber optic pathway may be provided through the platform.

In certain embodiments, an optical transmitter, such as a light emitting diode (LED) for example, is incorporated within the power outlet 5210 and is configured and operable to transmit electromagnetic radiation of a type and intensity capable of penetrating the casing of the electrical device 5290, and the surface layer 5642. An optical receiver, such as a photodiode, a phototransistor, a light dependent resistors of the like, is incorporated within the primary unit for receiving the electromagnetic radiation transmitted through the surface layer 5642.

It is noted that many materials are partially translucent to infra-red light. It has been found that relatively low intensity infra red signals from LEDs and the like, penetrate several hundred microns of common materials such as plastic, cardboard, Formica or paper sheet, to a sufficient degree that an optical receiver, such as a photodiode, a phototransistor, a light dependent resistors or the like, behind a sheet of from 0.1 mm to 2 mm of such materials, can receive and process the signal. For example a signal from an Avago HSDL-4420 LED transmitting at 850 nm over 24 degrees, may be detected by an Everlight PD15-22C-TR8 NPN photodiode, from behind a 0.8 mm Formica sheet. For signalling purposes, a high degree of attenuation may be tolerated, and penetration of only a small fraction, say 0.1% of the transmitted signal intensity may be sufficient. Thus an infra-red signal may be used to provide a communication channel between primary and secondary units galvanically isolated from each other by a few hundred microns of wood, plastic, Formica, wood veneer, glass or the like.

The transmitter 5140 and receiver 5160 may be laterally displaced from the primary coil 5220 and secondary coil 5260. In preferred embodiments, however, the transmitter 5140 is located at the center of the secondary coil 5260 and the receiver 5160 is located at the center of the primary coil 5220. This permits alignment to be maintained through 360 degree rotation of the secondary coil 5260 relative to the primary coil 5220.

The processor 5162 is configured to receive the values of the input power $P_{in}$, directly from the input power monitor 5122, and the output power $P_{out}$, via the receiver 5160. The processor 5162 then calculates the efficiency quotient Q. In normal usage as represented in FIG. 6a, the processor records an efficiency quotient Q higher than a predetermined threshold so power transmission continues uninterrupted. When the efficiency quotient Q falls below a predetermined threshold, this indicates that power is being drawn from the primary coil 5220 by some power drain other than the secondary coil 5260.

Figure 6B:
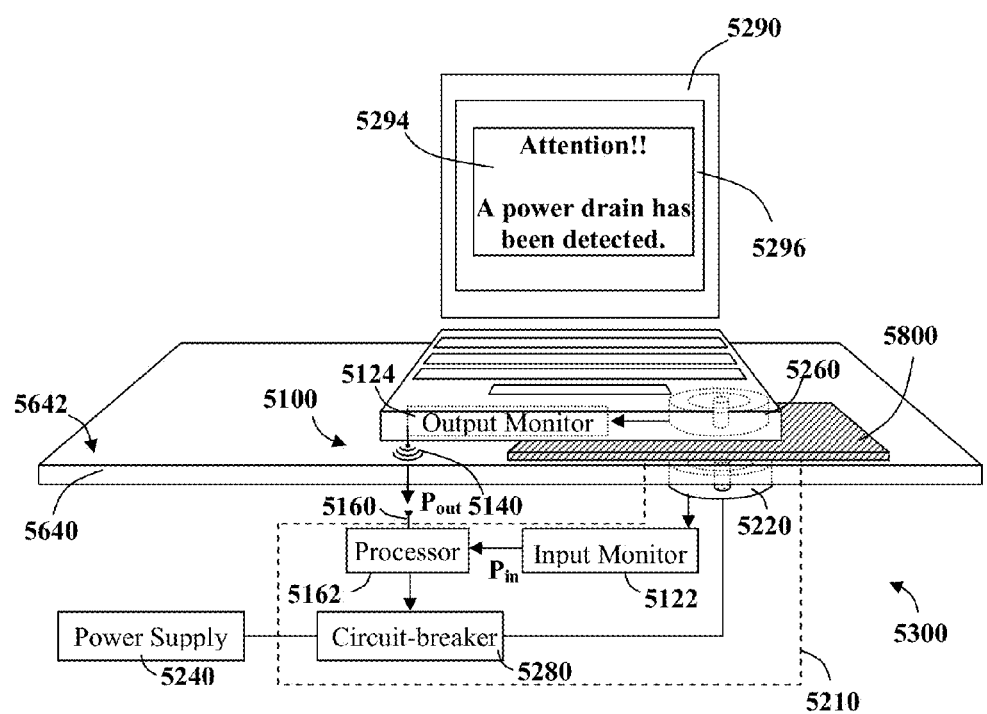
FIG. 6b is a schematic diagram of the inductive power outlet of FIG. 6a wherein a power drain has been introduced between the primary and secondary coils.

FIG. 6b is a schematic diagram of the inductive power outlet 5210 of FIG. 6a wherein a power drain such as a conductive sheet of metallic foil 5800 is introduced between the primary coil 5220 and the secondary coil 5260. The oscillating magnetic field produced by the primary coil 5220 when connected to a high frequency oscillating voltage from a driver 5230, produces eddy currents in the conductive sheet 5800 thereby heating the conductive sheet and draining power from the primary coil 5220. Such a power drain may be wasteful and/or dangerous. It will be appreciated that leak prevention systems which cut off power to the primary coil 5220 if no secondary coil 5260 is coupled thereto, would fail to detect this hazard.

In contradistinction to previous systems known to the inventors, embodiments of the present invention measure the efficiency quotient Q. Consequently, when a power drain is introduced, such as that shown in FIG. 6b, for example, the output power $P_{out}$ received by the secondary coil 5260 is lower than normal and the efficiency quotient Q may therefore drop below the predetermined threshold. The efficiency monitor 5300 is thus able to detect the hazard.

According to certain embodiments, additional detectors (not shown) may be incorporated within the power outlet 5210, the platform 5640 or the electrical device 5290 for monitoring other scientific effects which may be indications of possible hazards such as the magnetic field generated by the primary coil 5220, or the temperature of the platform 5640 for example. Such detectors may function in accordance with one or more of a variety of principles, including, inter alia, magnetic sensing means, Hall probes, heat sensors or electromagnetic sensors.

The processor 5162 may assess the level of the hazard detected by processing the various signals received according to a predetermined logical sequence. If necessary, the processor 5162 may trigger a circuit-breaker 5280 thereby cutting off the primary coil 5220 from the power supply 5240. Depending on the nature of the hazard, the processor 5162 may additionally or alternatively alert a user to the hazard. The alert may be a visual or audio alarm for example, such as a buzzer or light incorporated in the power transmission surface, or a signal sent to the computer 5290 which displays a warning 5294 on its visual display 5296 or emits a warning sound.

In preferred embodiments the output power $P_{out}$ may be monitored and encoded into the input signal $S_{in}$. The coil-to-coil signal generator shown in FIG. 2a may be used to transmit the input signal $S_{in}$ from a transmission circuit 2140 (FIG. 2a) incorporated within an electrical device 290 (FIG. 1) and is retrievable by the receiver circuit 2160 (FIG. 2a) incorporated within the power outlet 210 (FIG. 1) from the output signal $S_{out}$. The retrieved signal may then be communicated to a processor which uses it to calculate the efficiency quotient Q.

Figure 7:
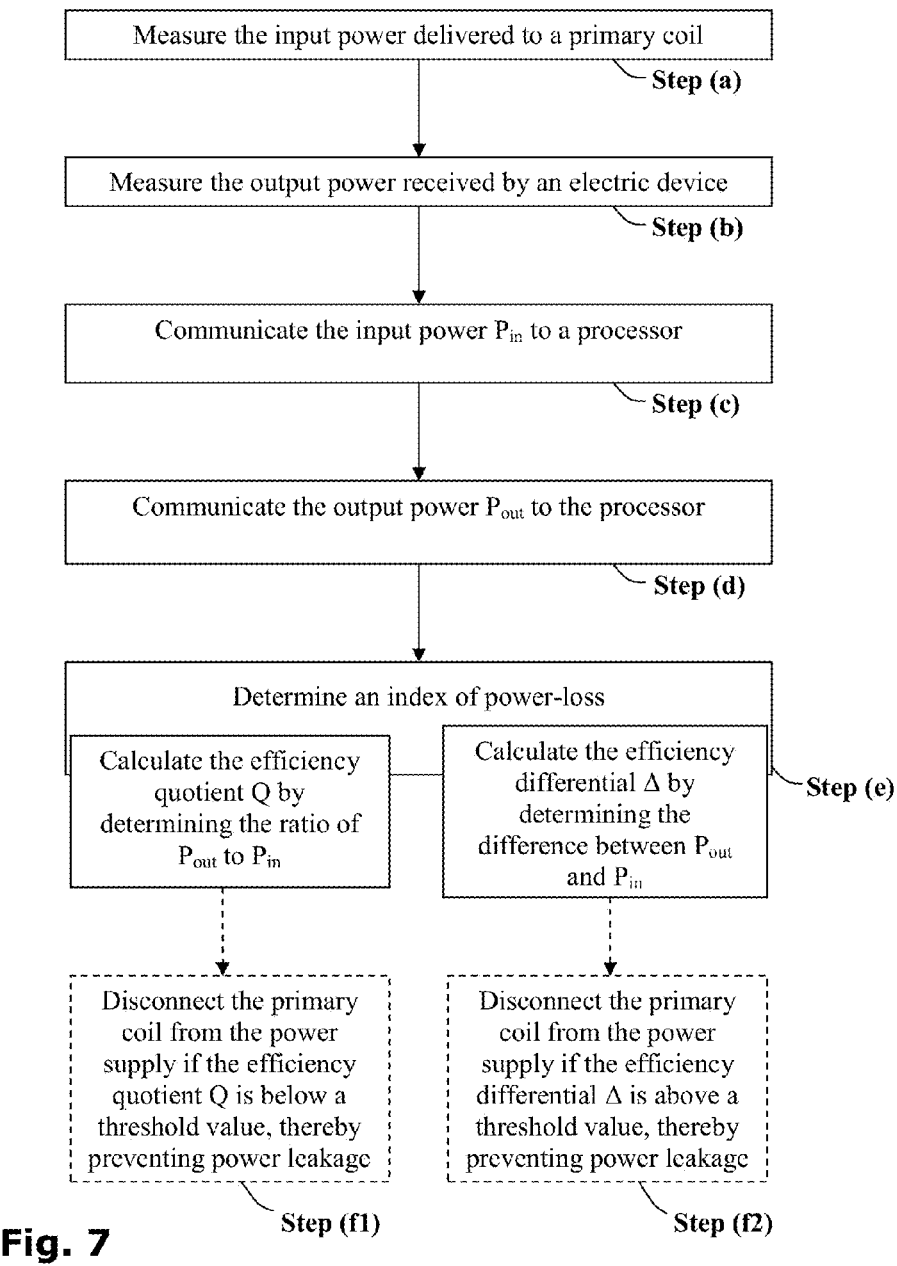
FIG. 7 is a flow diagram of a method for using the signal transfer system to monitor the efficiency of power transmission by an inductive power outlet.

Reference is now made to FIG. 7 showing a flow diagram of a method for monitoring the efficiency of power transmission by an inductive power outlet according to a further embodiment of the present invention. The method includes the following steps:
 a) measuring the input power delivered to a primary coil;
 b) measuring the output power received by an electric device;
 c) communicating the input power $P_{in}$ to a processor;
 d) communicating the output power $P_{out}$ to the processor;
 e) determining an index of power-loss, such as an efficiency quotient Q or efficiency differential $\Delta$;
 f) optionally, disconnecting the primary coil from the power supply, for example if the efficiency quotient Q is below a threshold value (f1) or the efficiency differential $\Delta$ is above a threshold value (f2), thereby preventing power leakage.

Primary Coil Locators

Another aspect of the invention is directed to providing a power outlet locator for locating an inductive power outlet of the type comprising at least one primary coil wired to a power supply for inductively coupling with a secondary coil wired to an electrical device. Typically, the power outlet locator comprises at least one sensor for detecting the at least one power outlet, at least one processor for receiving a sensor signal from the at least one sensor and computing at least one coordinate of a location of the at least one power outlet and at least one user interface for receiving a signal from the processor and communicating the location to a user.

Preferably, at least one sensor is selected to detect radiation transmitted by the at least one the power outlet. Typically, at least one sensor is selected to detect an electromagnetic field generated by at least one the primary coil. Optionally the processor calculates the distance between the sensor and the power outlet by comparing the intensity of the radiation received by the sensor with a reference value. Typically, the processor determines the direction to the power outlet by comparing the relative intensities of the radiation detected by a plurality of the sensors. Alternatively the location of the power outlet is encoded into a signal transmitted by the power outlet and decoded by the processor.

Typically, the user interface comprises a visual display. Optionally, the visual display indicates the direction of the power outlet. Preferably, the visual display indicates the distance to the power outlet. Preferably, the visual display comprises a graphical user interface representing at least a section of a target comprising concentric rings centered on a point indicating the location of the power outlet. Typically, the power outlet is concealed behind a surface and the target is superimposed upon an image of the surface. Alternatively or additionally, the user interface comprises an audible signal.

Another aspect of the invention is to provide an electrical device incorporating a power outlet locator. Typically, the electrical device additionally comprises at least one secondary inductive coil for powering the electrical device. Optionally, the electrical device additionally comprises at least one electrochemical power cell for powering the electrical device and at least one the secondary inductive coil wired to the electrochemical cell via a rectifier for charging the electrochemical power cell. The electrical device may be, but is not necessarily, selected from the group comprising: telephones, personal digital assistants (PDAs), cameras, media players, computers, keyboards and mice.

Figure 8A:
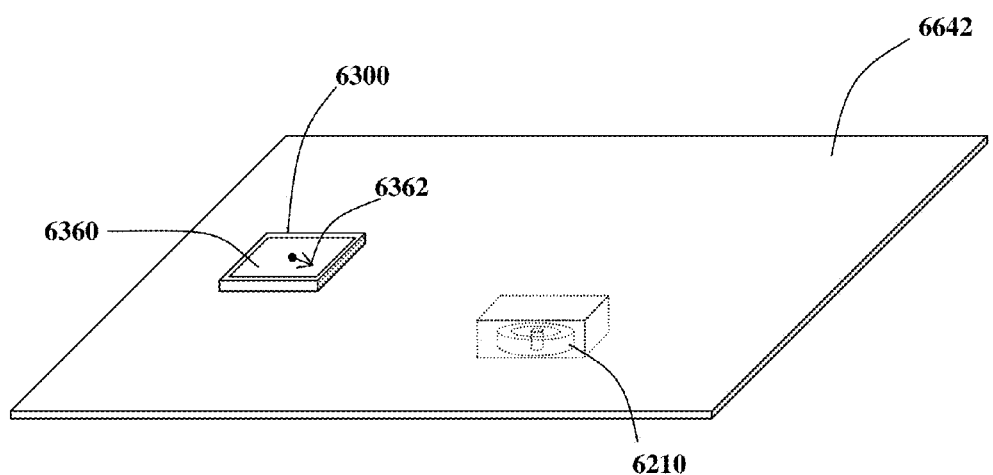
FIG. 8a is a schematic representation of another embodiment of the signal transfer system incorporated into a power outlet locator used to indicate the location of an inductive power outlet concealed behind a surface.

Reference is now made to FIG. 8a showing a schematic representation of such a power outlet locator 6300 which utilizes such a signal transfer system. The location of an inductive power outlet 6210, concealed behind a surface 6642, is indicated by an arrow 6362 displayed upon a visual user interface 6360.

The inductive power outlet 6210 is wired to a power source typically via a driver 230 (FIG. 1) providing the electronics necessary to drive the inductive power outlet 6210, such as a switching unit providing a high frequency oscillating voltage supply, for example.

The inductive power outlet 6210 may be incorporated into a vertical surface such as a wall of a building or a cabinet. The inductive power outlet 6210 may be concealed behind a surface 6642 of wallpaper or stretched canvas for example. Alternatively the inductive power outlet 6210 may be incorporated behind a facing layer of a horizontal platform such as a desk-top, a kitchen work-top, a conference table or a work bench for example of mica, Formica or wood veneer. Alternatively, again, an inductive power outlet 6210 may be concealed beneath flooring such as rugs, fitted carpet, parquet, linoleum, floor tiles, tiling, paving and the like.

Figure 8B:
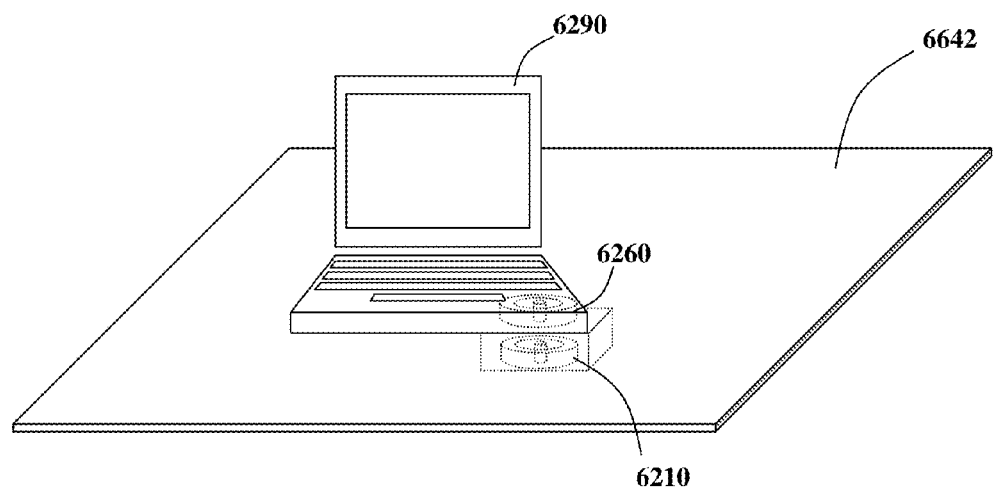
FIG. 8b is a schematic representation of a computer standing on the surface of FIG. 8a and being powered by the concealed primary outlet.

It will be apparent that when the location of the inductive power outlet 6210 is known, a secondary coil 6260 may be brought into alignment therewith, as shown in FIG. 8b, for example. Thus with reference to FIG. 8b, the inductive power outlet 6210 may inductively couple with the secondary coil 6260 and thereby power an electrical device, such as a computer 6290, wired to the secondary coil 6260. It is noted that according to some embodiments, the electrical device, such as a computer 6290 may itself incorporate an integral inductive power outlet locator.

Figure 9:
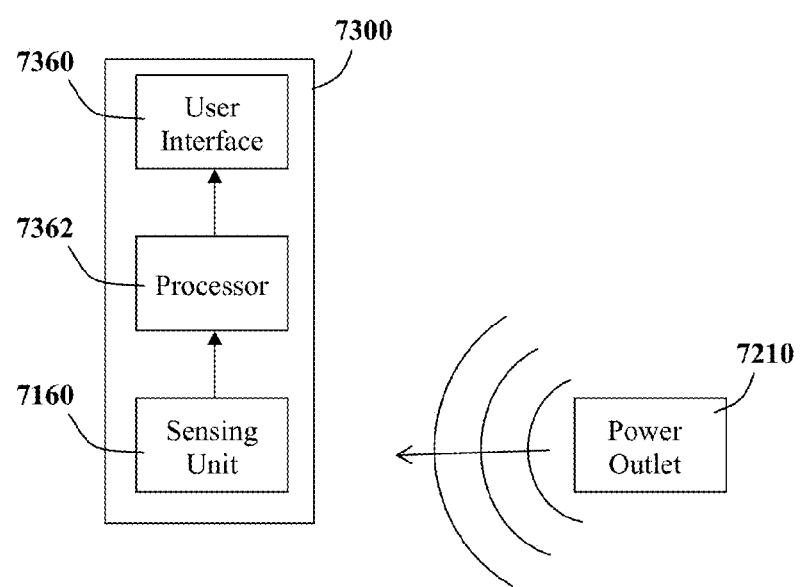
FIG. 9 is a block diagram representing the main features of the power outlet locator.

With reference now to FIG. 9, a block diagram representing the main functional components of a power outlet locator 7300 is shown. A sensing unit 7160 configured and operable to detect an inductive power outlet 7210 is provided. A processor 7362, in communication with the sensing unit 7160, is configured to compute the location of the power outlet 7210. A user interface 7360 is provided for communicating the computed location to a user.

According to various embodiments, the sensor unit 7160 may incorporate magnetic sensors such as Hall probes, for example, configured to detect the magnetic field generated by the inductive power outlet directly. Alternatively, the sensor unit 7160 may incorporate a radio receiver for receiving a radio signal transmitted from the power outlet. It will be appreciated, however, that appropriate sensors may be selected for detecting specific electromagnetic wavelengths, including ultra-violet radiation, micro waves, radio waves or even x-ray or shorter wavelengths. Furthermore, the sensing unit may be configured to receive other types of radiation, including mechanical vibrations such as both audible and inaudible (e.g. ultrasonic) sound waves.

Figure 10:
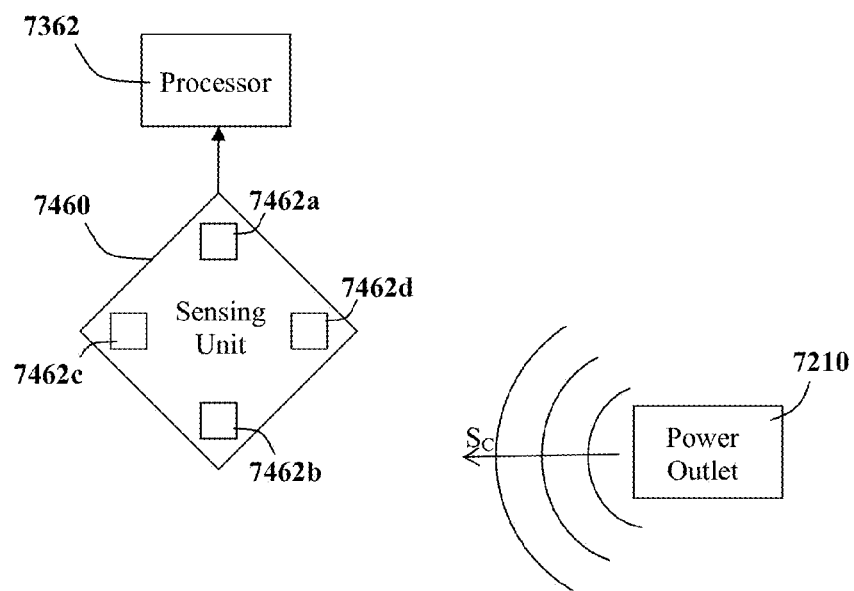
FIG. 10 is a schematic representation of a power outlet locator with four sensors.

By way of example, an exemplary sensing unit 7460 is represented in FIG. 10, four sensors 7462a-d, such as proximity sensors based on volume sensors, infra-red sensors, ultrasonic sensors, magnetic sensors (like Hall probes), inductance sensors, capacitance sensors or the like, are arranged in a diamond configuration.

Each sensor 7462 is configured to receive a control signal $S_C$ transmitted from an inductive power outlet 7210. The processor 7362 may compare the intensity I of the control signal $S_C$ detected by a sensor 7462 with a reference value $I_r$ to indicate the distance between the sensor 7462 and the power outlet 7210.

Furthermore, the diamond configuration, provides two perpendicular opposing pairs of sensors 7462a-b, 7462c-d. The intensity I of the control signal $S_C$ is measured by each sensor independently. The processor 7460 may use the differences between intensities measured by opposing pairs ($I_a$-$I_b$), ($I_c$-$I_d$) to provide vector coordinates indicating the direction of the power outlet 7210. Although a two dimensional vector is computed using the two dimensional diamond configuration of sensors described hereinabove, it will be appreciated that a three dimensional vector may be computed from three pairs of sensors in a tetrahedral configuration.

It will be appreciated that the computation method herein described are by way of example, for illustrative purposes only. Alternative methods by which the processor may compute the direction of the power outlet will be familiar to those skilled in the art.

Figure 11:
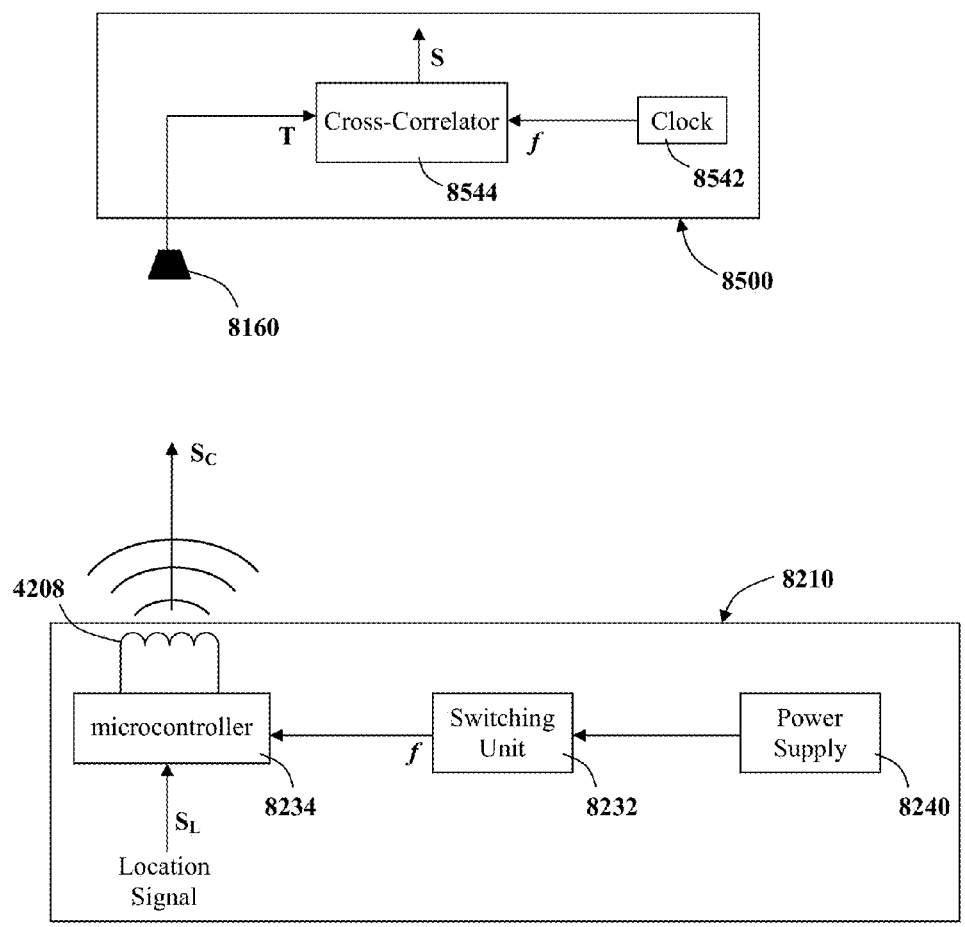
FIG. 11 is a block diagram representing a power outlet locator configured to receive and decode a control signal transmitted by a power outlet using still another embodiment of the signal transfer system.

FIG. 11 shows a block diagram representing a power outlet locator 8500 in accordance with yet another embodiment. An inductive power outlet 8210 transmits a control signal $S_C$ which carries an encoded location signal $S_L$ identifying the location of the inductive power outlet 8210. A primary coil 8220 is connected to a power supply 8240 via a switching unit 8232 and a microcontroller 8234. The switching unit 8232 is configured to intermittently connect the power supply 8240 to the primary coil 8220 with a bit-rate frequency f. The location of the primary coil 8220 is encoded into a location signal $S_L$ which is sent to the microcontroller 8234. The microcontroller 8234 is configured to modulate the bit-rate signal with the location signal $S_L$.

The voltage applied to the primary coil 8220 is thus a modulated variable voltage with a frequency f, carrying an encoded location signal $S_L$. It will be appreciated that the variable voltage may produce a radio wave of frequency if which may be transmitted as a control signal $S_C$. Alternatively, the control signal $S_C$ may be transmitted by a dedicated transmitter separate from the primary coil 8220.

The power outlet locator 8500 includes a receiver 8160, a clock 8542 and a cross-correlator 8544. The radio receiver 8160 is tunable to receive radio waves of frequency f, such that it may receive the control signal $S_C$. The clock 8542 produces a fixed reference signal R of frequency f. The cross-correlator 8544 receives both the reference signal R from the clock 8542 and the control signal $S_C$ from the receiver 8160 and by cross-correlating these signals the location signal $S_L$ is isolated.

Although a digital bit-rate modulated control signal $S_C$ is described hereinabove, it will be appreciated that the control signal $S_C$ may alternatively be modulated in other ways such as by analogue or digital frequency modulation or by amplitude modulation, for example.

The location of the power outlet 8210 may thereby be transmitted to a remote power outlet indicator 8500, which may then output the location of the power outlet 8210 a user interface 7360 (FIG. 9).

Figure 12A:
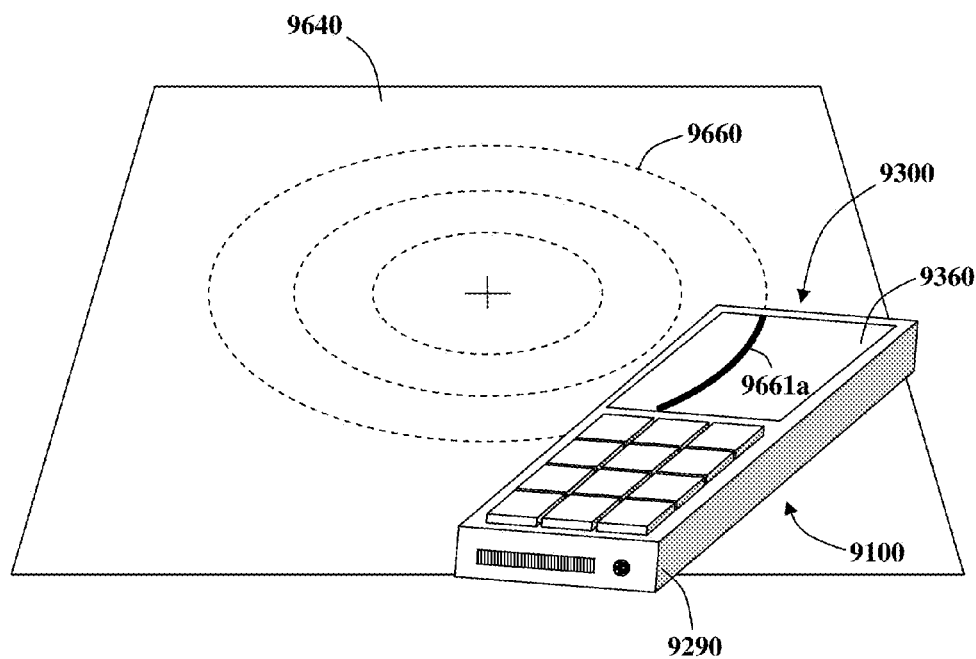
FIG. 12a-c are schematic representations of a mobile phone incorporating a power outlet locator, wherein a graphical user interface represents a virtual target superimposed over an image of the surface.
Figure 12B:
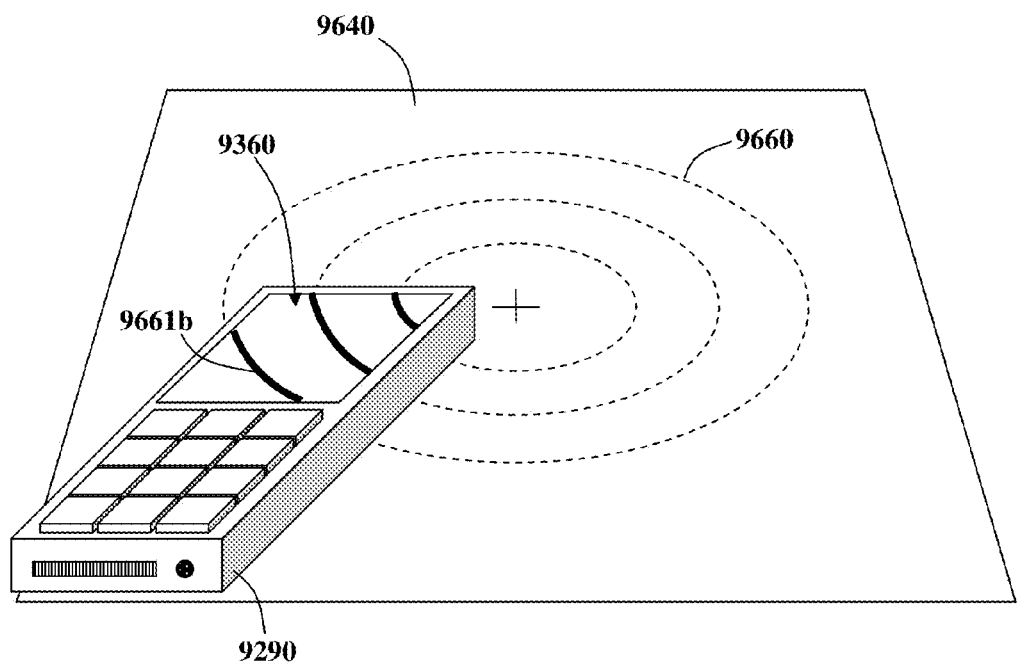
Figure 12C:
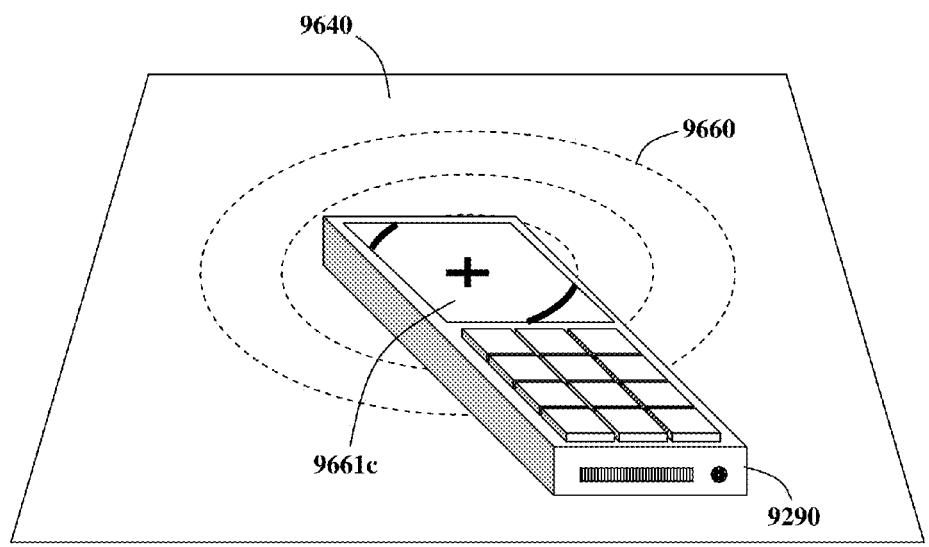

As shown in FIGS. 12a-c, a power outlet locator 9300 may be incorporated into a mobile phone 9290, for example, thereby providing a convenient means of locating concealed inductive power outlets. A graphical user interface 9360, displayed upon the visual display of the mobile phone 9290, represents a virtual target 9660, centered upon the power outlet (not shown) and superimposed over the surface 9640 behind which the power outlet is concealed.

Although the whole of the virtual target 9660 is represented by a dotted line in FIGS. 12a-c for convenience, only the section 9661a-c of the virtual target 9660 in the visual display 9360 of the mobile phone 9290 will normally be visible. The displayed section depends upon the location of the mobile phone 9290. Thus the curvature of the visible concentric arcs may indicate both the direction and distance to the power outlet. It will be appreciated that the virtual target 9660 may be displayed upon a blank background or alternatively may be superimposed upon an image of the surface 9640, for example a real time image produced by the camera (not shown) of the mobile phone 9660.

It is further noted that the mobile phone 9290 may itself carry a secondary inductive coil (not shown) wired to a electrochemical cell via a rectifier for inductively coupling with a inductive power outlet and charging the electrochemical power cell. Optimal alignment between the secondary coil and the inductive power outlet may additionally be indicated by an audible signal such as a ring-tone or the like. In other embodiments, particularly useful for the visually impaired, an audible signal may be additionally or alternatively be provided to guide the user to the power outlet, perhaps verbally or alternatively through other variations in pitch, volume or timbre.

It will be apparent that in certain situations such as when the power source of the mobile phone 9660 is completely devoid of power, a power outlet locator 9300 which draws power from the mobile phone 9290 is impractical. In alternative embodiments, therefore, a power outlet locator may be an independently powered unit with a user interface separate from that of the mobile phone 9290. For example, in another embodiment, the power outlet locator draws power from the secondary inductive coil. Additionally or alternatively, it may include a dedicated electrochemical power source, for example. The relative brightness of four light emitting diodes mounted upon the corners of the mobile phone may indicate both the direction and proximity to a primary coil.

Whilst the power outlet locator 9300 is incorporated into a mobile phone 9290 it is noted that such a power outlet locator may alternatively be incorporated within other electrical devices such as fixed telephones, personal digital assistants (PDAs), cameras, media players, computers, keyboards, cursor controllers (e.g. mice) and the like.

Secondary Coil Locators

The signal transfer system may be associated with the primary coil and used to detect the location of the secondary inductive coil. For example, in a power outlet surface comprising multiple primary coils, each primary coil may be independently connected to the power source via a driver. The signal transfer system may be used to identify the primary coil closest to the location of a secondary coil. Typically, the primary coils may be driven at multiple power levels, such that a low power level is used to locate the secondary coil and a higher power is used to transfer power when a secondary coil is located.

In preferred embodiments the secondary coil is wired to a transmission circuit comprising an ancillary load connectable to the secondary coil via a half-wave rectifier, such as a diode. The transmission circuit may also comprise a smoothing capacitor, a low power current source and a DC to DC converter.

When in detection mode, the driver activates each primary coil sequentially at low power. When a secondary coil is close enough to a primary coil to inductively couple with it, the low power pulse is transferred from the primary coil to the secondary coil. An AC voltage is induced in the secondary coil and the transmission circuit is activated. A DC current is produced by the half-wave rectifier and flows through the ancillary load.

A control signal is transmitted by the secondary coil due to the transmission circuit. Because half-wave rectification is used, even harmonics of the power transmission frequency are generated. These may be detected by a reception circuit connected to the primary coil, for example by cross-correlating the power transmission frequency with a reference clock frequency.

The strength of the even harmonic signals may indicate the proximity of the primary to the secondary coil. Once a secondary coil is detected, the driver may switch the closest primary coil to power transmission mode, typically at a higher power.

It will be appreciated that in applications where a main electric load is itself wired to the secondary coil via an AC-DC power converter which performs half-wave rectification, even harmonics are produced whenever the secondary coil is coupled to a primary coil, whether or not the ancillary load is connected. The strength and phase of both odd and even harmonics may be continuously monitored during power transmission so that if the secondary coil is displaced or removed it will be readily detected. Optionally the transmission circuit may be deactivated when power is provided to the electric load. Alternatively, where the main load is wired to the secondary coil via a half-wave rectifier, the ancillary load may be dispensed with entirely.

Figure 13:
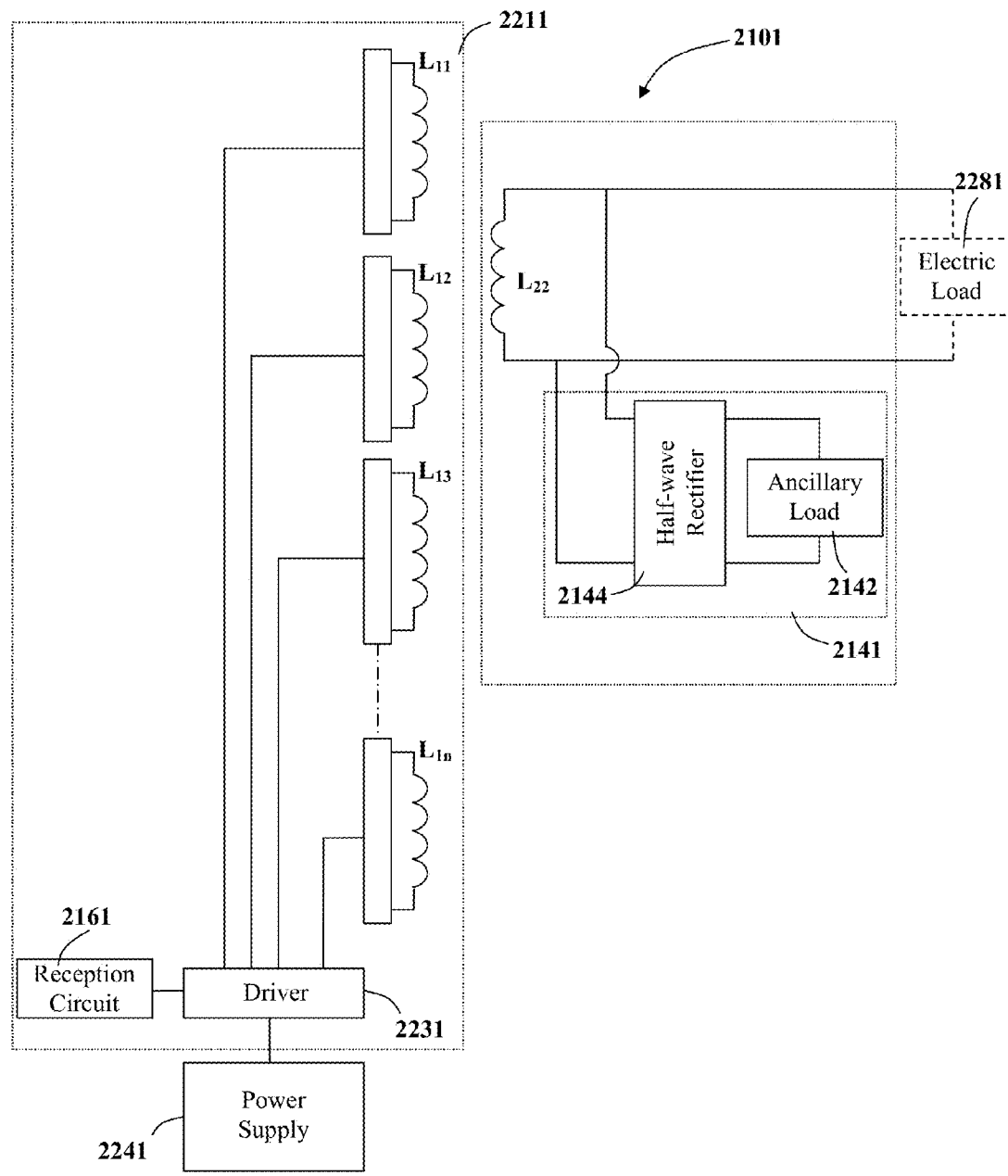
FIG. 13 is a schematic representation of a signal transfer system incorporated into a system for locating secondary coils placed upon a multi-coil power transmission surface.

FIG. 13 shows the signal transfer system 2101 according to yet another embodiment of the invention. The signal transfer system 2101 is used for locating a secondary coil $L_{22}$ wired to an electric load 2281, which is placed somewhere over a multi-coil power transmission surface 2211.

The multi-coil power transmission surface 2211 comprises an array of primary coils $L_{1n}$ each connected to a driver 2231 wired to a power source 2241. The signal transfer system 2101 includes a transmission circuit 2141 wired to the secondary coil 2221 and a reception circuit 2161 connected to the driver 2231. The transmission circuit 2141 includes a half-wave rectifier 2144 connected to an ancillary load 2142 and the reception circuit 2161 is configured to detect second harmonic signals in the power supplied to the primary inductive coil $L_{1n}$ when the secondary inductive coil $L_{22}$ is coupled thereto.

The driver 2231 is configured to selectively operate each primary inductive coil $L_{1n}$ in turn preferably at low power so as to identify which primary inductive coil is closest to the secondary inductive coil $L_{22}$. When a secondary coil $L_{22}$ is detected, the driver 2231 is then configured to operate the primary inductive coil $L_{1n}$ closest to the secondary inductive coil $L_{22}$ at a high power. It will be appreciated that for some purposes it may be desirable to disconnect the transmission circuit 2141 after the secondary inductive coil $L_{22}$ is coupled to a primary coil $L_{1n}$.

Thus a number of related technologies are presented that use signal transfer systems across an inductive power coupling to regulate the power and to detect and align the two coils.

The scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

What is claimed is:

1. A power outlet locator for locating an inductive power outlet concealed behind a surface, the power outlet comprising at least one primary coil wired to a power supply for inductively coupling with a secondary coil wired to an electrical load, wherein the power outlet locator comprises:
   at least one sensor for detecting at least one detection signal emitted by the inductive power outlet;
   at least one processor for receiving a sensor signal from the sensor and computing at least one coordinate of a location of the power outlet;
   a visual display; and
   at least one user interface for receiving a signal from the processor and communicating the location to a user through said visual display by displaying a target superimposed on an image of the surface.

2. The power outlet locator of claim 1 wherein the sensor is selected to detect an electromagnetic field and the detection signal comprises electromagnetic radiation emitted by at least one primary coil.

3. The power outlet locator of claim 1 wherein the processor is configured to calculate the distance between the sensor and the power outlet by comparing the intensity of the detection signal received by the sensor with a reference value.

4. The power outlet locator of claim 1 comprising a plurality of the sensors.

5. The power outlet location of claim 4 wherein the processor is configured to:
   compare intensity of the detection signal as detected by at least two sensors, and to calculate at least one component of a vector indicating direction towards the power outlet.

6. The power outlet locator of claim 1 wherein the location of the power outlet is encoded into the detection signal and the processor is configured to decode the detection signal.

7. The power outlet locator of claim 1 wherein the visual display indicates a direction towards the power outlet.

8. The power outlet locator of claim 1 wherein the visual display indicates a distance to the power outlet.

9. The power outlet locator of claim 1 wherein the visual display comprises a graphical user interface representing at least a section of a target comprising concentric rings centered on a point indicating a location of the power outlet.

10. The power outlet locator of claim 1 wherein the user interface comprises an audio emitter.

11. The power outlet locator of claim 10 wherein the audio emitter is configured to guide a user to the power outlet via audible signals varying in at least one of: pitch, volume and timbre.

12. The power outlet locator of claim 1 wherein the inductive power outlet further comprises at least one circuit breaker configured to disconnect the primary coil from the power supply.

13. The power outlet locator of claim 12 wherein the inductive power outlet is configured to emit the detection signal while the primary coil is disconnected from the power supply.

14. An electrical device incorporating the power outlet locator of claim 1.

15. The electrical device of claim 14 additionally comprising said secondary inductive coil.

16. The electrical device of claim 14 additionally comprising at least one electrochemical power cell for powering the electrical device.

17. The electrical device of claim 16 further comprising said secondary inductive coil wired to the electrochemical cell via a rectifier for charging the electrochemical power cell.

18. The electrical device of claim 14 being selected from the group comprising: telephones, personal digital assistants (PDAs), cameras, media players, computers, keyboards and mice.

19. The power outlet locator of claim 1 further comprising an audio emitter.

20. The power outlet locator of claim 10 wherein the audio emitter is configured to guide a user to the power outlet via audible signals varying in at least one of: pitch, volume and timbre.

21. The electrical device of claim 14 additionally comprising at least one electrochemical power cell for powering the electrical device.

22. The electrical device of claim 16 wherein said secondary inductive coil is wired to the electrochemical cell via a rectifier for charging the electrochemical power cell.

23. A power outlet locator operable to indicate the location of an inductive power outlet, said inductive power outlet comprising at least one primary inductive coil wired to a power supply for coupling with a secondary inductive coil wired to an electrical load, wherein said power outlet locator comprises:
   a mobile phone comprising a visual display and a camera, said visual display being configured to display a graphical user interface indicating the location of said inductive power outlet superimposed upon a real time image captured by said camera.

24. The power outlet locator of claim 23 wherein said graphical user interface is operable to display a virtual target.

25. The power outlet locator of 23 wherein the visual display indicates a direction towards the power outlet.

26. The power outlet locator of claim 23 wherein the visual display indicates a distance to the power outlet.

27. The power outlet locator of claim 23 wherein the visual display comprises a graphical user interface representing at least a section of a virtual target comprising concentric rings centered on a point indicating a location of the power outlet.

28. The power outlet locator of claim 27 wherein the power outlet is concealed behind a surface and the target is superimposed upon an image of the surface.

29. The power outlet locator of claim 23 further comprising said secondary inductive coil.

30. The power outlet locator of claim 23 wherein said graphical user interface is operable to display a virtual target centered upon the location of the power outlet.

* * * * *